US012362514B2

(12) United States Patent
Si et al.

(10) Patent No.: US 12,362,514 B2
(45) Date of Patent: Jul. 15, 2025

(54) ELECTRICAL CONNECTOR WITH CONDUCTIVE MEMBER WELDED TO CONDUCTIVE ELEMENTS

(71) Applicant: FCI USA LLC, Etters, PA (US)

(72) Inventors: Jason Si, Toronto (CA); Ba Pham, Toronto (CA); Xingye Chen, Markham (CA); Sam Kocsis, Nashua, NH (US)

(73) Assignee: FCI USA LLC, Etters, PA (US)

( * ) Notice: Subject to any disclaimer, the term of this patent is extended or adjusted under 35 U.S.C. 154(b) by 177 days.

(21) Appl. No.: 17/940,250

(22) Filed: Sep. 8, 2022

(65) Prior Publication Data

US 2023/0006390 A1 Jan. 5, 2023

Related U.S. Application Data

(63) Continuation of application No. 17/031,557, filed on Sep. 24, 2020, now Pat. No. 11,444,404.

(Continued)

(51) Int. Cl.

*H01R 13/46* (2006.01)
*H01R 13/658* (2011.01)
*H01R 24/60* (2011.01)

(52) U.S. Cl.

CPC ........... *H01R 13/46* (2013.01); *H01R 13/658* (2013.01); *H01R 24/60* (2013.01)

(58) Field of Classification Search

CPC .............. H01R 13/6471; H01R 13/658; H01R 13/6585; H01R 13/46; H01R 24/60

See application file for complete search history.

(56) References Cited

U.S. PATENT DOCUMENTS 5,037,330 A 8/1991 Fulponi et al.
5,066,236 A 11/1991 Broeksteeg (Continued)

FOREIGN PATENT DOCUMENTS

CN 1610991 A 4/2005
CN 1681218 A 10/2005

(Continued)

OTHER PUBLICATIONS

Chinese Office Action for Chinese Application No. 201880057597.X, mailed Dec. 3, 2021.

(Continued)

*Primary Examiner* — Oscar C Jimenez

(74) *Attorney, Agent, or Firm* — Wolf, Greenfield & Sacks, P.C.

(57) ABSTRACT

A stacked I/O connector for use with a high speed, high density transceiver that generates a large amount of heat. The connector may be formed with a web-like housing into which leadframe assemblies are inserted. The web-like housing may have openings in the front, back, top and/or sides, enabling airflow through the connector with little resistance. Sidewall openings may open into a channel between the housing and a wall of cage, enabling air flowing to cool transceivers inserted into the cage to pass through the connector assembly with low resistance and high cooling efficiency. A cage for the connector may have openings selectively positioned such that air flowing through the cage to cool transceivers mated to the I/O connector may pass through the connector with low resistance, enhancing cooling efficiency. Such a connector may be used with OSFP transceivers to meet signal integrity and thermal requirements at 112 GBps and beyond.

30 Claims, 12 Drawing Sheets

Related U.S. Application Data

(60) Provisional application No. 62/992,089, filed on Mar. 19, 2020, provisional application No. 62/991,161, filed on Mar. 18, 2020, provisional application No. 62/907,513, filed on Sep. 27, 2019.

(56) References Cited

U.S. PATENT DOCUMENTS

| | | | |
|---|---|---|---|
| 5,280,191 A | 1/1994 | Chang | |
| 5,332,397 A | 7/1994 | Ingalsbe | |
| 5,637,015 A | 6/1997 | Tan et al. | |
| 5,797,770 A | 8/1998 | Davis et al. | |
| 5,808,236 A | 9/1998 | Brezina et al. | |
| 5,865,646 A | 2/1999 | Ortega et al. | |
| 5,924,890 A | 7/1999 | Morin et al. | |
| 6,022,239 A | 2/2000 | Wright | |
| 6,215,666 B1 | 4/2001 | Hileman et al. | |
| 6,238,241 B1 | 5/2001 | Zhu et al. | |
| 6,283,786 B1 | 9/2001 | Margulis et al. | |
| 6,517,382 B2 | 2/2003 | Flickinger et al. | |
| 6,749,448 B2 | 6/2004 | Bright et al. | |
| 6,776,649 B2 | 8/2004 | Pape et al. | |
| 6,811,326 B2 | 11/2004 | Keeble et al. | |
| 6,816,376 B2 | 11/2004 | Bright et al. | |
| 6,846,115 B1 | 1/2005 | Shang et al. | |
| 6,872,094 B1 | 3/2005 | Murr et al. | |
| 7,070,446 B2 | 7/2006 | Henry et al. | |
| 7,175,444 B2 | 2/2007 | Lang et al. | |
| 7,198,519 B2 | 4/2007 | Regnier et al. | |
| 7,303,438 B2 | 12/2007 | Dawiedczyk et al. | |
| 7,422,483 B2 | 9/2008 | Avery et al. | |
| 7,448,897 B2 | 11/2008 | Dawiedcyzk et al. | |
| 7,497,693 B1 | 3/2009 | Wu | |
| 7,540,747 B2 | 6/2009 | Ice et al. | |
| 7,553,190 B2 | 6/2009 | Laurx et al. | |
| 7,575,471 B2 | 8/2009 | Long | |
| 7,585,188 B2 | 9/2009 | Regnier | |
| 7,764,504 B2 | 7/2010 | Phillips et al. | |
| 7,781,294 B2 | 8/2010 | Mauder et al. | |
| 7,806,698 B2 | 10/2010 | Regnier | |
| 7,871,294 B2 | 1/2011 | Long | |
| 7,914,304 B2 | 3/2011 | Cartier et al. | |
| RE43,427 E | 5/2012 | Dawiedczyk et al. | |
| 8,358,504 B2 | 1/2013 | McColloch et al. | |
| 8,465,320 B2 | 6/2013 | Long | |
| 8,469,738 B2 | 6/2013 | Long | |
| 8,475,210 B2 | 7/2013 | Wang et al. | |
| 8,545,240 B2 * | 10/2013 | Casher | H01R 13/6474 439/108 |
| 8,597,045 B2 | 12/2013 | Zhu et al. | |
| 8,740,644 B2 | 6/2014 | Long | |
| 8,764,464 B2 | 7/2014 | Buck et al. | |
| 8,830,679 B2 | 9/2014 | Scholeno | |
| 8,858,243 B2 | 10/2014 | Luo et al. | |
| 8,870,471 B2 | 10/2014 | Ito et al. | |
| 9,004,942 B2 | 4/2015 | Paniagua | |
| 9,077,118 B2 | 7/2015 | Szu et al. | |
| 9,118,151 B2 | 8/2015 | Tran et al. | |
| 9,136,634 B2 | 9/2015 | De Geest et al. | |
| 9,210,817 B2 | 12/2015 | Briant et al. | |
| 9,246,262 B2 | 1/2016 | Brown et al. | |
| 9,246,280 B2 | 1/2016 | Neer et al. | |
| 9,276,358 B2 | 3/2016 | Ista et al. | |
| 9,337,585 B1 | 5/2016 | Yang | |
| 9,368,916 B2 | 6/2016 | Heyvaert et al. | |
| 9,389,368 B1 | 7/2016 | Sharf | |
| 9,509,102 B2 | 11/2016 | Sharf et al. | |
| 9,520,680 B2 | 12/2016 | Hsu et al. | |
| 9,653,829 B2 | 5/2017 | Long | |
| 9,668,378 B2 | 5/2017 | Phillips | |
| 9,671,582 B2 | 6/2017 | Yeh et al. | |
| 9,711,901 B2 | 7/2017 | Scholeno | |
| 9,761,974 B2 | 9/2017 | L'Esperance et al. | |
| 9,829,662 B2 | 11/2017 | Kurashima | |
| 9,929,500 B1 | 3/2018 | Ista | |
| 10,020,614 B1 | 7/2018 | Bucher | |
| 10,062,984 B2 | 8/2018 | Regnier | |
| 10,109,968 B2 | 10/2018 | Khazen et al. | |
| 10,114,182 B2 | 10/2018 | Zbinden et al. | |
| 10,128,627 B1 | 11/2018 | Kazav et al. | |
| 10,135,211 B2 * | 11/2018 | Lloyd | H01R 12/79 |
| 10,136,517 B2 | 11/2018 | Shirasaki | |
| 10,153,571 B2 | 12/2018 | Kachlic | |
| 10,243,305 B1 | 3/2019 | Pan et al. | |
| 10,276,995 B2 | 4/2019 | Little | |
| 10,348,007 B2 | 7/2019 | Kataoka et al. | |
| 10,367,283 B2 | 7/2019 | L'Esperance et al. | |
| 10,367,308 B2 | 7/2019 | Little et al. | |
| 10,374,355 B2 | 8/2019 | Ayzenberg et al. | |
| 10,381,767 B1 | 8/2019 | Milbrand, Jr. et al. | |
| 10,446,960 B2 | 10/2019 | Guy Ritter et al. | |
| 10,461,475 B2 * | 10/2019 | Little | H01R 13/6658 |
| 10,462,904 B2 | 10/2019 | Shirasaki | |
| 10,511,118 B2 | 12/2019 | Beltran et al. | |
| 10,551,580 B2 | 2/2020 | Regnier et al. | |
| 10,555,437 B2 | 2/2020 | Little | |
| 10,588,243 B2 | 3/2020 | Little et al. | |
| 10,651,606 B2 | 5/2020 | Little | |
| 10,797,417 B2 | 10/2020 | Scholeno et al. | |
| 10,847,930 B2 | 11/2020 | Ayzenberg et al. | |
| 11,050,176 B2 | 6/2021 | Yang et al. | |
| 11,070,006 B2 | 7/2021 | Gailus et al. | |
| 11,101,611 B2 | 8/2021 | Winey et al. | |
| 11,143,830 B2 | 10/2021 | Luo et al. | |
| 11,177,592 B2 | 11/2021 | Scholeno et al. | |
| 11,189,943 B2 | 11/2021 | Zerebilov et al. | |
| 11,271,348 B1 | 3/2022 | Chen et al. | |
| 11,309,655 B2 | 4/2022 | Avery et al. | |
| 11,444,404 B2 | 9/2022 | Si et al. | |
| 11,509,100 B2 | 11/2022 | Chen et al. | |
| 11,637,390 B2 | 4/2023 | Zerebilov et al. | |
| 11,670,879 B2 | 6/2023 | Zerebilov | |
| 11,715,922 B2 | 8/2023 | Winey et al. | |
| 2002/0197043 A1 | 12/2002 | Hwang | |
| 2003/0129876 A1 | 7/2003 | Hasircoglu | |
| 2005/0037655 A1 | 2/2005 | Henry et al. | |
| 2005/0255726 A1 | 11/2005 | Long | |
| 2006/0160429 A1 | 7/2006 | Dawiedczyk et al. | |
| 2006/0249820 A1 | 11/2006 | Ice et al. | |
| 2008/0194146 A1 * | 8/2008 | Gailus | H01R 13/46 439/607.05 |
| 2010/0018738 A1 | 1/2010 | Chen et al. | |
| 2010/0078738 A1 | 4/2010 | Chambers et al. | |
| 2010/0248544 A1 | 9/2010 | Xu et al. | |
| 2011/0034075 A1 | 2/2011 | Feldman et al. | |
| 2011/0081114 A1 | 4/2011 | Togami | |
| 2011/0300757 A1 * | 12/2011 | Regnier | H01R 13/6474 439/626 |
| 2012/0003848 A1 | 1/2012 | Casher et al. | |
| 2012/0052712 A1 | 3/2012 | Wang | |
| 2012/0058665 A1 | 3/2012 | Zerebilov | |
| 2012/0058670 A1 | 3/2012 | Regnier et al. | |
| 2012/0148198 A1 | 6/2012 | Togami et al. | |
| 2012/0164860 A1 | 6/2012 | Wang | |
| 2012/0184145 A1 | 7/2012 | Zeng | |
| 2012/0202370 A1 | 8/2012 | Mulfinger et al. | |
| 2012/0221758 A1 | 8/2012 | Hunkins et al. | |
| 2013/0012038 A1 | 1/2013 | Kirk et al. | |
| 2013/0034999 A1 | 2/2013 | Szczesny et al. | |
| 2013/0065454 A1 | 3/2013 | Milbrand Jr. | |
| 2013/0078870 A1 | 3/2013 | Milbrand, Jr. | |
| 2013/0084744 A1 | 4/2013 | Zerebilov et al. | |
| 2013/0164970 A1 | 6/2013 | Regnier et al. | |
| 2013/0273781 A1 | 10/2013 | Buck et al. | |
| 2013/0288513 A1 | 10/2013 | Masubuchi et al. | |
| 2014/0035755 A1 | 2/2014 | Ward | |
| 2014/0154912 A1 | 6/2014 | Hirschy | |
| 2014/0193993 A1 | 7/2014 | Meng | |
| 2014/0286613 A1 | 9/2014 | Ito et al. | |
| 2014/0334792 A1 | 11/2014 | Bragg | |
| 2015/0072561 A1 | 3/2015 | Schmitt et al. | |
| 2015/0079814 A1 | 3/2015 | Tamai | |
| 2015/0079845 A1 | 3/2015 | Wanha et al. | |
| 2015/0093083 A1 | 4/2015 | Tsai et al. | |

(56) References Cited

U.S. PATENT DOCUMENTS

| | | | |
|---|---|---|---|
| 2015/0132990 | A1 | 5/2015 | Nong Chou et al. |
| 2015/0280368 | A1 | 10/2015 | Bucher |
| 2015/0288110 | A1 | 10/2015 | Tanguchi et al. |
| 2016/0004022 | A1 | 1/2016 | Ishii |
| 2016/0054527 | A1 | 2/2016 | Tang et al. |
| 2016/0104990 | A1 | 4/2016 | Laurx et al. |
| 2016/0131859 | A1 | 5/2016 | Ishii et al. |
| 2016/0156133 | A1 | 6/2016 | Masubuchi et al. |
| 2016/0172803 | A1 | 6/2016 | Tamai |
| 2016/0174412 | A1 | 6/2016 | Karaaslan et al. |
| 2016/0211623 | A1 | 7/2016 | Sharf et al. |
| 2016/0315425 | A1 | 10/2016 | Nishimori et al. |
| 2016/0336692 | A1 | 11/2016 | Champion et al. |
| 2017/0054234 | A1 | 2/2017 | Kachlic |
| 2017/0077643 | A1 | 3/2017 | Zbinden et al. |
| 2017/0222374 | A1 | 8/2017 | Saito et al. |
| 2017/0285282 | A1 | 10/2017 | Regnier et al. |
| 2018/0062323 | A1 | 3/2018 | Kirk et al. |
| 2018/0089966 | A1 | 3/2018 | Ward |
| 2018/0212385 | A1 | 7/2018 | Little |
| 2018/0278000 | A1 | 9/2018 | Regnier |
| 2018/0287280 | A1 | 10/2018 | Ratkovic |
| 2018/0294592 | A1* | 10/2018 | Huang ............... H01R 13/6596 |
| 2018/0309214 | A1 | 10/2018 | Lloyd et al. |
| 2018/0366880 | A1 | 12/2018 | Zerebilov et al. |
| 2019/0013617 | A1 | 1/2019 | Ayzenberg et al. |
| 2019/0044284 | A1 | 2/2019 | Dunham |
| 2019/0115677 | A1 | 4/2019 | Kachlic |
| 2019/0181582 | A1 | 6/2019 | Beltran et al. |
| 2019/0191094 | A1 | 6/2019 | Khoe et al. |
| 2020/0076455 | A1 | 3/2020 | Sharf |
| 2020/0091637 | A1 | 3/2020 | Scholeno et al. |
| 2020/0142142 | A1 | 5/2020 | Luo et al. |
| 2020/0220289 | A1 | 7/2020 | Scholeno et al. |
| 2020/0244025 | A1 | 7/2020 | Winey et al. |
| 2020/0274267 | A1 | 8/2020 | Zerebilov |
| 2020/0274295 | A1 | 8/2020 | Briant |
| 2021/0098927 | A1 | 4/2021 | Si et al. |
| 2021/0384691 | A1 | 12/2021 | Winey et al. |
| 2022/0094111 | A1 | 3/2022 | Duan et al. |
| 2022/0158371 | A1 | 5/2022 | Zerebilov et al. |
| 2022/0287205 | A1 | 9/2022 | Huang et al. |
| 2022/0352675 | A1 | 11/2022 | Zerebilov et al. |
| 2023/0253722 | A1 | 8/2023 | Zerebilov |
| 2023/0299518 | A1 | 9/2023 | Zerebilov et al. |
| 2023/0352895 | A1 | 11/2023 | Winey et al. |

FOREIGN PATENT DOCUMENTS

| | | | |
|---|---|---|---|
| CN | 101132094 | A | 2/2008 |
| CN | 201114063 | Y | 9/2008 |
| CN | 101330173 | A | 12/2008 |
| CN | 101364692 | A | 2/2009 |
| CN | 201229997 | Y | 4/2009 |
| CN | 102106046 | A | 6/2011 |
| CN | 201956529 | U | 8/2011 |
| CN | 102570152 | A | 7/2012 |
| CN | 102823073 | A | 12/2012 |
| CN | 102986091 | A | 3/2013 |
| CN | 103140994 | A | 6/2013 |
| CN | 103969768 | A | 8/2014 |
| CN | 104518363 | A | 4/2015 |
| CN | 105811154 | A | 7/2016 |
| CN | 105826740 | A | 8/2016 |
| CN | 107111075 | A | 8/2017 |
| CN | 107454794 | A | 12/2017 |
| CN | 108475891 | A | 8/2018 |
| CN | 108713355 | A | 10/2018 |
| CN | 109273932 | A | 1/2019 |
| CN | 109980386 | A | 7/2019 |
| CN | 111769395 | A | 10/2020 |
| CN | 111769396 | A | 10/2020 |
| CN | 212412345 | U | 1/2021 |
| CN | 213151165 | U | 5/2021 |
| CN | 112993659 | A | 6/2021 |
| CN | 113422243 | A | 9/2021 |
| CN | 215184602 | U | 12/2021 |
| EP | 0635912 | A1 | 1/1995 |
| JP | H06-029061 | A | 2/1994 |
| JP | 2010-266729 | A | 11/2010 |
| JP | 2014-195061 | A | 10/2014 |
| JP | 6193595 | B2 | 9/2017 |
| JP | 6599548 | B2 | 10/2019 |
| JP | 1656986 | S | 4/2020 |
| JP | 1668637 | S | 9/2020 |
| JP | 1668730 | S | 9/2020 |
| KR | 10-2010-0055197 | A | 5/2010 |
| KR | 10-2015-0067010 | A | 6/2015 |
| KR | 10-2015-0101020 | A | 9/2015 |
| KR | 10-2016-0038192 | A | 4/2016 |
| TW | 200910710 | A | 3/2009 |
| TW | M403134 | U | 5/2011 |
| TW | 201320504 | A | 5/2013 |
| TW | M470214 | U | 1/2014 |
| TW | 201521295 | A | 6/2015 |
| TW | 201637298 | A | 10/2016 |
| TW | I600222 | B | 9/2017 |
| TW | D209874 | S | 2/2021 |
| WO | WO 2007/005598 | A2 | 1/2007 |
| WO | WO 2017/123574 | A1 | 7/2017 |
| WO | WO 2017/164418 | A1 | 9/2017 |
| WO | WO 2017/218771 | A1 | 12/2017 |
| WO | WO 2018/226805 | A1 | 12/2018 |
| WO | WO 2021/070273 | A1 | 4/2021 |

OTHER PUBLICATIONS

Chinese Office Action for Chinese Application No. 201880057597.X, mailed Jan. 5, 2021.

Chinese Office Action dated May 10, 2022 in connection with Chinese Application No. 202080016725.3.

Chinese Office Action dated Jun. 9, 2022 in connection with Chinese Application No. 202080019763.4.

International Search Report and Written Opinion for International Application No. PCT/US2020/014799, mailed May 27, 2020.

International Search Report and Written Opinion for International Application No. PCT/US2020/014826, mailed May 27, 2020.

International Search Report and Written Opinion for International Application No. PCT/US2018/039919, dated Nov. 8, 2018.

International Search Report and Written Opinion for International Application No. PCT/US2020/052397 mailed Jan. 15, 2021.

International Preliminary Report on Patentability for International Application No. PCT/US2018/039919 mailed Jan. 16, 2020.

International Preliminary Report on Patentability mailed Aug. 5, 2021 in connection with International Application No. PCT/US2020/014799.

International Preliminary Report on Patentability mailed Aug. 5, 2021 in connection with International Application No. PCT/US2020/014826.

International Preliminary Report on Patentability mailed Apr. 7, 2022 in connection with International Application No. PCT/US2020/052397.

Invitation to Pay Additional Fees mailed Jul. 22, 2022 in connection with International Application No. PCT/US2022/026964.

International Search Report and Written Opinion mailed Oct. 6, 2022 in connection with International Application No. PCT/US2022/026964.

[No Author Listed], INF-8438i Specification for QSFP (Quad Small Formfactor Pluggable) Transceiver. Rev 1.0 Nov. 2006. SFF Committee. 75 pages.

[No Author Listed], INF-8628 Specification for QSFP-DD 8X Transceiver (QSFP Double Density) Rev 0.0 Jun. 27, 2016. SNIA SFF TWG Technology Affiliate. 1 page.

[No Author Listed], SFF-8663 Specification for QSFP+ 28 Gb/s Cage (Style A) Rev 1.7. Oct. 19, 2017. SNIA SFF TWG Technology Affiliate. 18 pages.

[No Author Listed], Specification for Quad Small Form Factor Pluggable Module 112. QSFP112 Published Specification Rev. 2.0. QSFP112 Multi-Source Agreement. Jan. 22, 2022. 55 pages.

(56) References Cited

OTHER PUBLICATIONS

PALKERT (ed), QSFP-DD Overview. Mar. 14, 2017. 19 pages. URL:http://www.qsfp-dd.com.
U.S. Appl. No. 18/136,827, filed Apr. 19, 2023, Zerebilov et al..
U.S. Appl. No. 18/137,984, filed Apr. 21, 2023, Zerebilov.
U.S. Appl. No. 18/346,172, filed Jun. 30, 2023, Winey et al.
EP 20869047.9, Sep. 29, 2023, Extended European Search Report.
Chinese Office Action dated Oct. 10, 2023 in connection with Chinese Application No. 202080082425.5.
Extended European Search Report dated Sep. 29, 2023 in connection with European Application No. 20869047.9.
Winey et al., I/O Connector Configured For Cabled Connection To The Midboard, U.S. Appl. No. 18/346,172, filed Jun. 30, 2023.
Taiwanese Office Action dated Nov. 13, 2024 in connection with Taiwanese Application No. 109133166.

* cited by examiner

ELECTRICAL CONNECTOR WITH CONDUCTIVE MEMBER WELDED TO CONDUCTIVE ELEMENTS

CROSS-REFERENCE TO RELATED APPLICATIONS

This application is a continuation claiming priority to and the benefit of U.S. patent application Ser. No. 17/031,557, filed on Sep. 24, 2020, entitled "HIGH PERFORMANCE STACKED CONNECTOR," which claims priority to and the benefit of U.S. Provisional Application Ser. No. 62/992,089, filed on Mar. 19, 2020, entitled "HIGH PERFORMANCE STACKED CONNECTOR." U.S. patent application Ser. No. 17/031,557 also claims priority to and the benefit of U.S. Provisional Application Ser. No. 62/991,161, filed on Mar. 18, 2020, entitled "HIGH PERFORMANCE STACKED CONNECTOR." U.S. patent application Ser. No. 17/031,557 also claims priority to and the benefit of U.S. Provisional Application Ser. No. 62/907,513, filed on Sep. 27, 2019, entitled "HIGH PERFORMANCE STACKED CONNECTOR." The entire contents of these applications are incorporated herein by reference in their entirety.

BACKGROUND

An electronic system may include two or more electronic devices connected with a cable. The devices may have input/output (I/O) connectors for connecting with plug connectors terminating the ends of the cable. The cable may be constructed to carry electrical or optical signals. For transmitting optical signals, a transceiver is provided at one end of the cable for converting the optical signals to electrical signals. A transceiver may also be provided for a cable that carries electrical signals, as the signals may be amplified or converted between a signal format used on the cable and a signal format used within a device.

The plugs and I/O connectors may be constructed according to standards that enable components from different manufacturers to mate. For example, the Quad Small Form-factor Pluggable (QSFP) standard defines a compact, hot-pluggable transceiver used for data communications applications. The form factor and electrical interface are specified by a multi-source agreement (MSA) under the auspices of the Small Form Factor (SFF) Committee. Components made according to the QSFP standard is widely used to interface networking hardware (such as servers and switches) to fiber optic cables or active or passive electrical connections.

A QSFP plug mates with a receptacle, which is typically mounted on a printed circuit board (PCB). To block electromagnetic interference (EMI), the receptacle may be located within a metal cage also mounted to the PCB. The receptacle is typically set back from the edge of the PCB and located at the back portion of the cage. The front portion of the cage usually extends through a panel of an electronic device and has an opening for receiving the QSFP transceiver. A channel extends from the opening at the front portion of the cage toward the rear portion to guide the transceiver into engagement with the receptacle. Such an arrangement may be used to connect a circuit board inside an electronic device to an external device using a cable.

A transceiver for converting optical signals to electrical signals may consume a lot of power, and therefore generate a lot of heat. A QSFP transceiver might consume 12 Watts (W) of power, for example. Transceivers that process more signals, such as transceivers made according to a QSFP-DD standard, may consume up to 15 W. Large amounts of heat may cause the temperature around electronic, optical, or other components to exceed the rated operating temperature, contributing to errors during operation or reducing the lifetime of the components. Heat generated by a transceiver may be dissipated through the use of a cooling fan that flows air over the metal cage. Heat sinks may be mounted to the outside of the cage to further dissipate heat from the transceiver.

Similar issues of high heat generation within a small area arise with other form factors, such as OSFP, which is expected to generate heat in the range of 7.5 to 15 W per transceiver.

In some systems, two or more transceivers are disposed in close proximity to each other. I/O connectors may be configured in a "stacked" configuration to support use of multiple transceivers. For example, an upper transceiver and lower transceiver may be stacked within one cage to make a double stacked connector.

BRIEF SUMMARY

In one aspect, the invention relates to an I/O connector, including one or more features to provide thermal and/or electrical performance when used with a OSFP or similar transceiver.

In one aspect, a stacked connector may comprise a housing and a plurality of conductive elements. The housing may have a first sidewall and a second sidewall, opposite the first sidewall; a mating face extending between the first sidewall and the second sidewall, the mating face comprising a first slot and a second slot; a mounting face, perpendicular to the mating face and extending between the first sidewall and the second sidewall; a top face, opposite the mounting face and extending between the first sidewall and the second sidewall. Each of the plurality of conductive elements may comprise a mating contact portion, a contact tail and an intermediate portion joining the mating contact portion and the contact tail. The mating contact portions may be exposed within the first slot and the second slot. The contact tails may be exposed at the mounting face. At least one of the first sidewall or the second sidewall may comprise a segment adjacent the mounting face and a portion extending from the segment to the top face. The portion may comprise at least one airflow opening therethrough.

Another aspect relates to a method of operating an electronic device comprising an enclosure comprising a panel having an opening therethrough; an I/O connector assembly comprising a connector and a cage mounted to a printed circuit board exposed through an opening in the panel, wherein the cage comprises at least one channel; and a transceiver positioned within a channel of the at least one channel. The method may comprise operating the transceiver at a data rate in excess of 110 Gbps; and expelling air from the enclosure so as to cause a flow of air along a path through the cage, the path comprising a segment through openings in sidewalls of the connector and through a channel between the sidewalls of the connector and sidewalls of the cage.

In yet another embodiment, a stacked connector of the type having a mounting face and a mating face perpendicular to the mounting face and sides perpendicular to both the mating face and the mounting face may comprise a housing and a plurality of lead assemblies. The housing may comprise at least a first slot portion and a second slot portion, wherein each of the first and second slot portions comprises a slot passing therethrough and walls bounding the slot. Opposing first and second side walls may bound a cavity within the housing. The first and second sidewalls may support the first slot portion and the second slot portion at the mating face such that at least 50% of the mating face of the housing between the first slot portion and the second slot portion is open to the passage of air into the cavity. The plurality of lead assemblies may be within the cavity, and each of the plurality of lead assemblies may comprise a plurality of conductive elements.

The foregoing is a non-limiting summary of the invention, which is defined by the appended claims.

DETAILED DESCRIPTION

The present disclosure is directed to an electronic connection system, which may be compliant with OSFP specifications. The inventors have recognized and appreciated I/O designs that provide both thermal and electrical properties that support operation with high speed transceivers, including at data rates above 110 GBps, even in a stacked configuration. The inventors have recognized and appreciated that an increased density of I/O connections may require improved heat dissipation when using I/O connectors that are conventionally positioned in a flow path for air cooling a transceiver.

Increased density may arise from transceivers that process more signals in the same space, such as may arise in transceivers compliant with the OSFP specification. Additionally, increased density may result from "stacking" connectors, which results in transceivers one above the other with only a small space between them. Connector designs may provide improved heat dissipation even for stacked connectors.

Those techniques may entail forming a connector with a web-like housing over all or portions of the exterior surfaces of the housing. A back wall, for example, may be opening, and there may be openings over a large portion, such as at least 50%, at least 60%, at least 75% or at least 80%, of portions of the mating face, top, and sides other than support members. Lead assemblies, inserted into the housing, may similarly be formed with openings to enable air to flow through the connector. That air may flow with relatively low resistance from front to back to align with the flow of cooling air in many electronic devices.

Moreover, metal members, or members that are at least partially conductive, may be attached to leads to improve signal integrity. These members may be positioned at locations where they provide a suitable improvement in signal integrity to support high data rates without providing an unacceptable resistance to airflow.

In some embodiments, the members that are at least partially conductive include projections that are electrically and mechanically coupled to select conductive elements in the connector. The select conductive elements, for example, may be ground conductors and electrical and mechanical coupling may be achieved by welding a metal member and/or metal portions of a member comprising both metal and lossy portions to the ground conductors. Connection of such members may increase signal integrity at higher frequencies, enabling the connector to carry high speed signals.

Figure 1A:
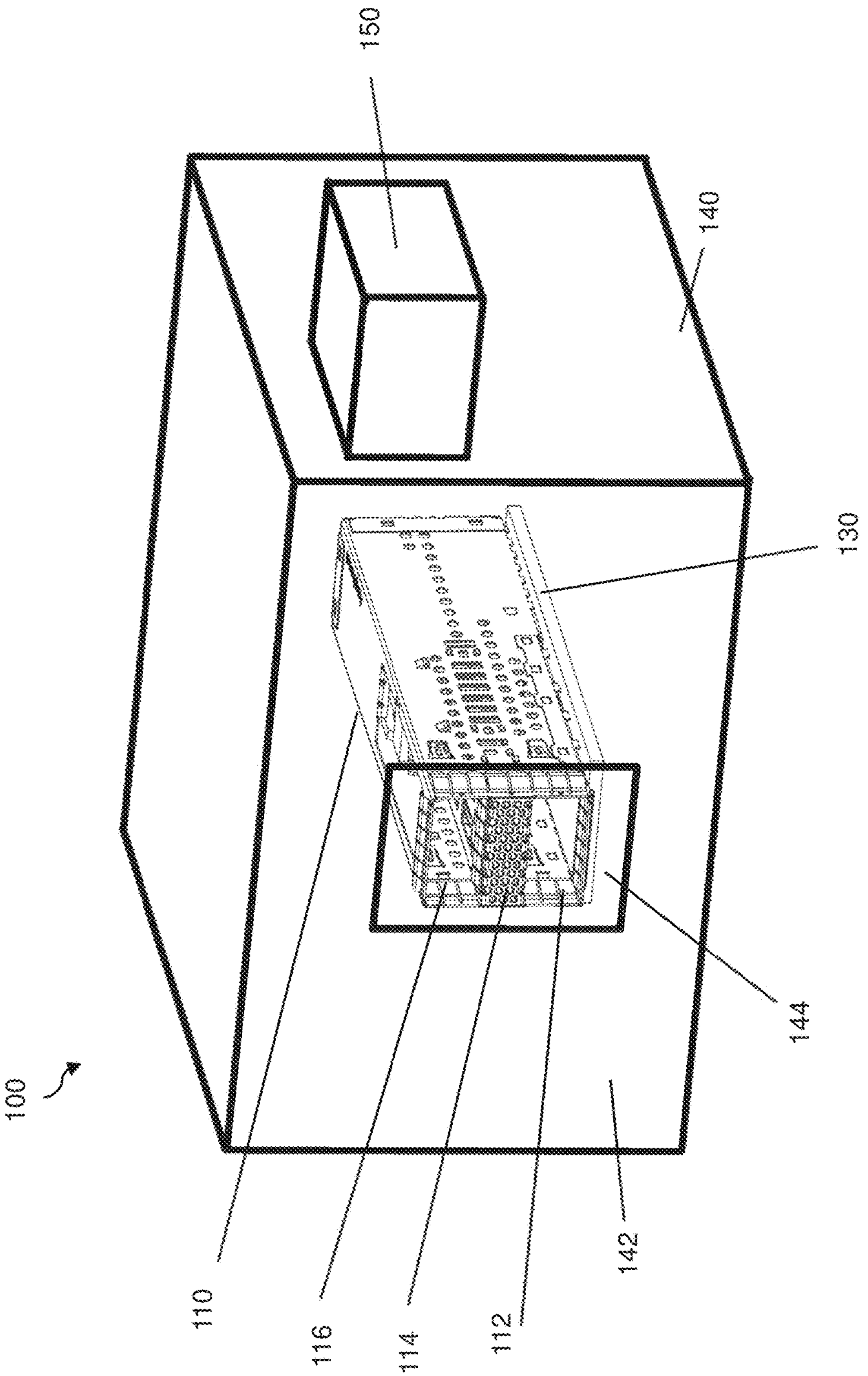
FIG. 1A is a simplified sketch of an electronic device including a stacked I/O connector within a cage.

Such connectors may be used in devices such as switches, routers, servers and other high-performance electronic devices, for example. As shown in FIG. 1A, an electronic system 100 may include an enclosure 140, the enclosure including a panel 142 with at least one opening 144 therethrough. The electronic system 100 may also include a printed circuit board 130 within the enclosure 140. The electronic system 100 may also include a cage 110. The cage 110 may be mounted to the printed circuit board 130 and may enclose a connector 200 (FIG. 2) mounted to the printed circuit board 130. The electronic system 100 may also include a fan 150. Fan 150, for example, may expel air from the enclosure, thereby causing an airflow 180.

In some embodiments, the cage 110 may be configured to provide shielding from electromagnetic interference. The cage 110 may be formed from any suitable metal or other conductive material and connected to ground for shielding against EMI using techniques known to one of skill in the art. The cage 110 may be formed from sheet metal bent into a suitable shape. However, some or all of the components of the cage may be made of other materials, such as die cast metal.

In the example shown in FIG. 1A, the cage 110 may include a first channel 112. The cage 110 may include a second channel 114. The cage 110 may include a third channel 116. In the embodiment illustrated, second channel 114 is between the first channel 112 and the third channel 116. The first channel 112 may be adjacent the printed circuit board 130. In this example, the first channel 112 and the third channel 116 may each be configured to receive a transceiver, each of which may mate with connector 200.

The cage 110 may be bounded by conductive top walls, conductive bottom walls, and/or conductive side walls. These walls and/or partitions internal to cage 110 may form the top and bottom walls of channels. One or more wall pieces may combine to provide shielding around each channel, and the transceivers that may be inserted into them.

According to some embodiments, the fan 150 may be positioned to cause air to flow over or through the cage 110. For example, fan 150 may be positioned to exhaust air from enclosure 140. FIG. 1A shows fan 150 schematically adjacent a wall of enclosure 140, but fan 150 may be positioned in any suitable location. Fan 150, for example, may be positioned inside enclosure 140. In some embodiments, such as in rack mounted electronic devices, I/O connectors may be exposed in a front face of the enclosure, and one or more fans exhaust air from an opposite, rear face of the enclosure. However, it will be appreciated that other suitable locations may create a pressure drop that causes air to flow over components within an electronic enclosure.

In the embodiment illustrated, second channel 114 has a face, exposed within opening 144 with a honeycomb pattern of holes. The holes may enable air to flow into second channel 114 such that air flow through cage 110 may enable dissipation of heat generated by transceivers within channels 112 and 116.

Figure 1C:
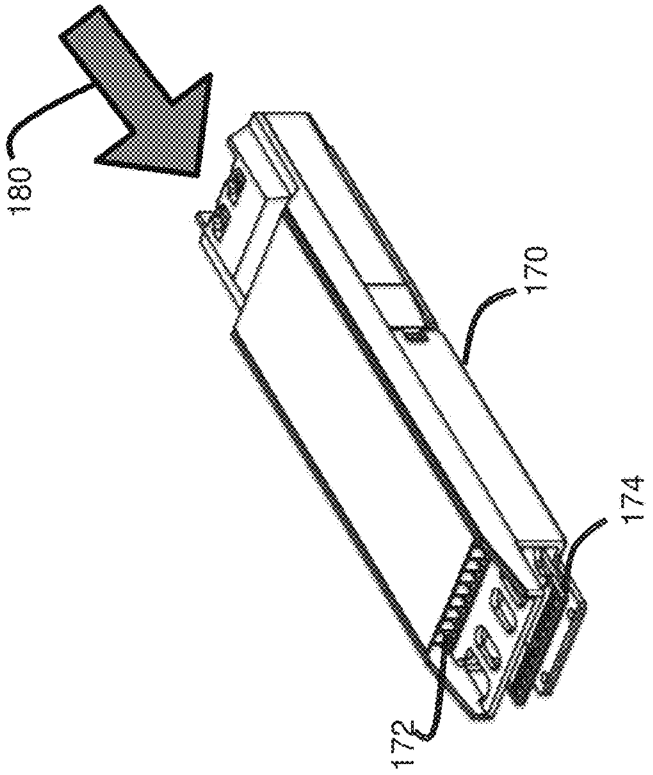
FIG. 1C is a perspective view of a transceiver with integrated heat sink that may be inserted into a channel of cage of FIG. 1B.
Figure 1B:
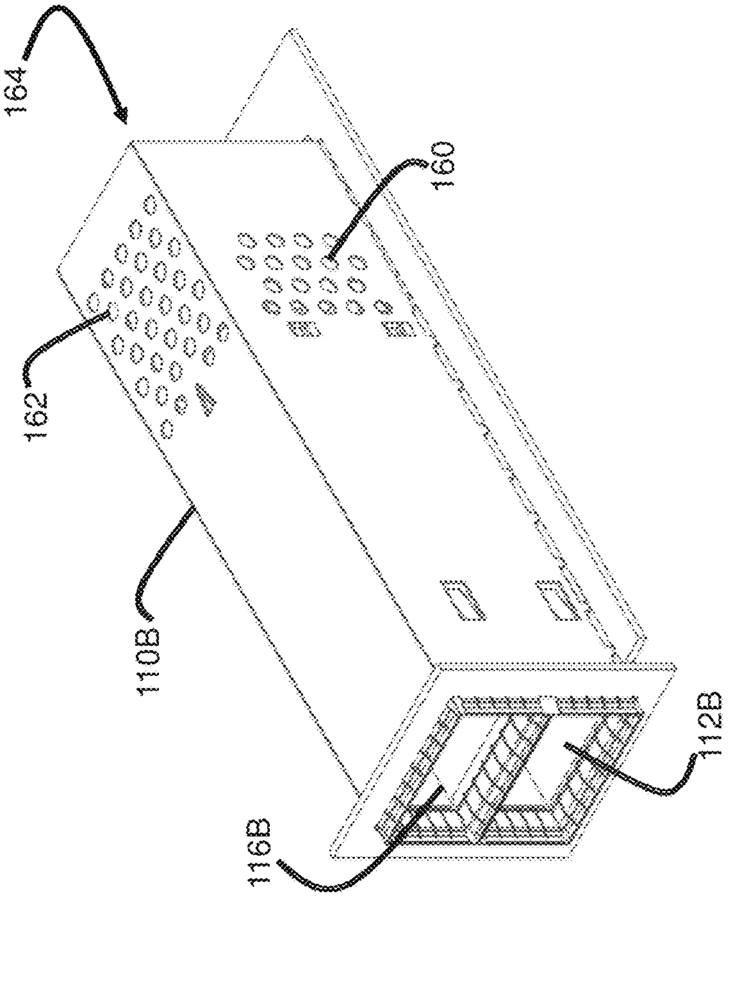
FIG. 1B is a perspective view of an alternative embodiment of a cage for a stacked I/O connector.

In some embodiments, a cage may enable airflow to cool transceivers mated with a stacked I/O connector without a middle channel, such as second channel 114. FIG. 1B illustrates such a cage 110B, with channels 112B and 116B, but no middle channels. In this example, cage 110B includes holes 160 in vertical sidewalls of the cage and holes 162 in a top surface of the cage. Similar holes may be included in back face 164, but such holes are not visible in FIG. 1B.

In the example of FIG. 1B, the channels 112B and 116B are sized to receive a transceiver with an integrated heat sink 172. An exemplary transceiver 170 is illustrated in FIG. 1C. Transceiver 170 includes a paddle card 174 that is configured to be inserted into a slot of a receptacle connector inside a cage.

In the embodiment illustrated, heat sink 172 includes multiple fins that extend vertically and parallel to the length of the channel into which it is inserted. Airflow along the elongated dimension of the channel may flow in an airflow direction 180 through and along the fins, carrying away heat. In the embodiment illustrated, heat sink 172 includes a cover plate, but such a cover plate may be absent in some embodiments.

In accordance with some embodiments, connector 200, mounted at the rear portion of cage 110B may also be configured to enable air to flow through cage 110B with low resistance. Lower resistance to flow, in turn, may increase the heat dissipation capacity of the system, and enable the system to operate with high-capacity transceivers such as transceivers operating according to the OSFP speciation, or other transceivers that may operate a data rates in excess of 110 Gbps, and in some embodiments at frequencies above 110 GHz, for example.

Figure 2B:
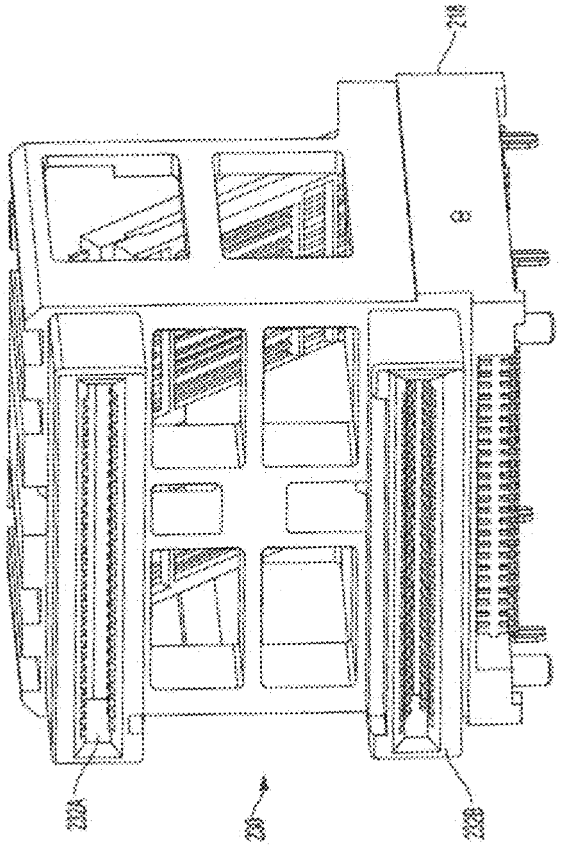
FIG. 2B is a front, side perspective view of the stacked I/O connector of FIG. 2A.
Figure 2A:
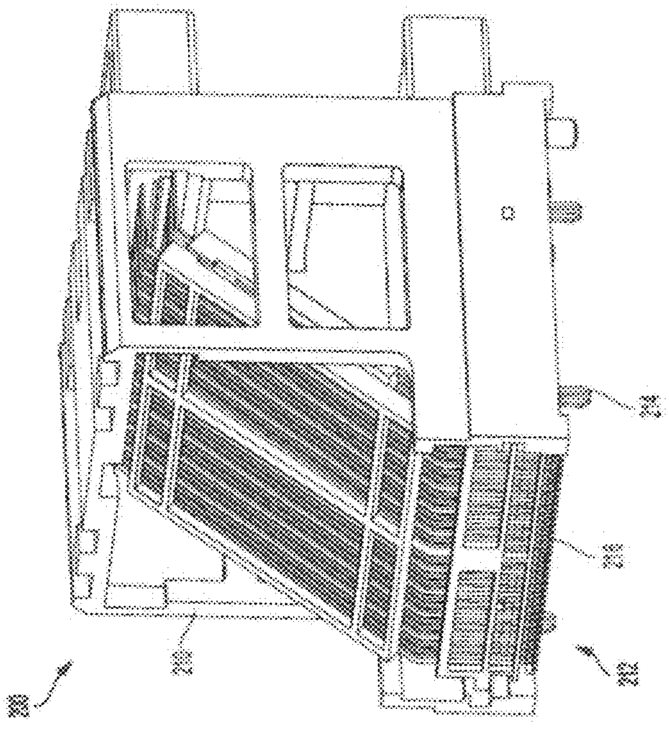
FIG. 2A is a rear, side perspective view of a stacked I/O connector.

FIG. 2A and FIG. 2B illustrate connector 200. In this example, connector 200 is a stacked, surface mount connector, configured for making with two transceivers inserted into two channels one above the other, such as channels 112 and 116. As illustrated, connector 200 may have a housing and/or plastic portions on wafers that are cored out to improve air flow and thermal performance. Connector 200, for example, has a web-like housing 210, which provides suitable support for conductive elements that mate with a transceivers inserted connector 200, but has substantial open portions such that air flow through a cage enclosing connector 200 (such as cage 110B, FIG. 1B) experiences little resistance.

Housing 210 may be molded from insulative material, such as plastic, nylon, PCP. Fiberglass or other fillers may be included in that material to establish desired dielectric properties and/or enhance the strength of the insulative material. In this example, housing 210 supports slot portion 232A and 232B at mating face 230. Each of the slot portions includes walls that bound a slot. In this example, the slot is configured to receive a mating portion of an OSFP transceiver. However, each slot portion may be configured to mate with other types of components.

Connector 200 is here shown as a right angle connector, configured as a stacked, surface mount (SMT), I/O connector. Mounting face 212 is perpendicular to mating face 230. Mounting face 212 include contact tails 216 of conductive elements passing through connector 200. In this example, the contact tails are surface mount contact tails. To facilitate surface mount attachment, mounting interface 212 may also include hold downs 214. Hold downs 214 may be embedded in segments 218 of sidewalls of the connector with a press fit portions extending through mounting interface 212, such that hold downs may be inserted into a printed circuit board (such as printed circuit board 130, FIG. 1) to which connector 200 is mounted, to position and retain connector 200 for surface mount soldering.

Figure 3:
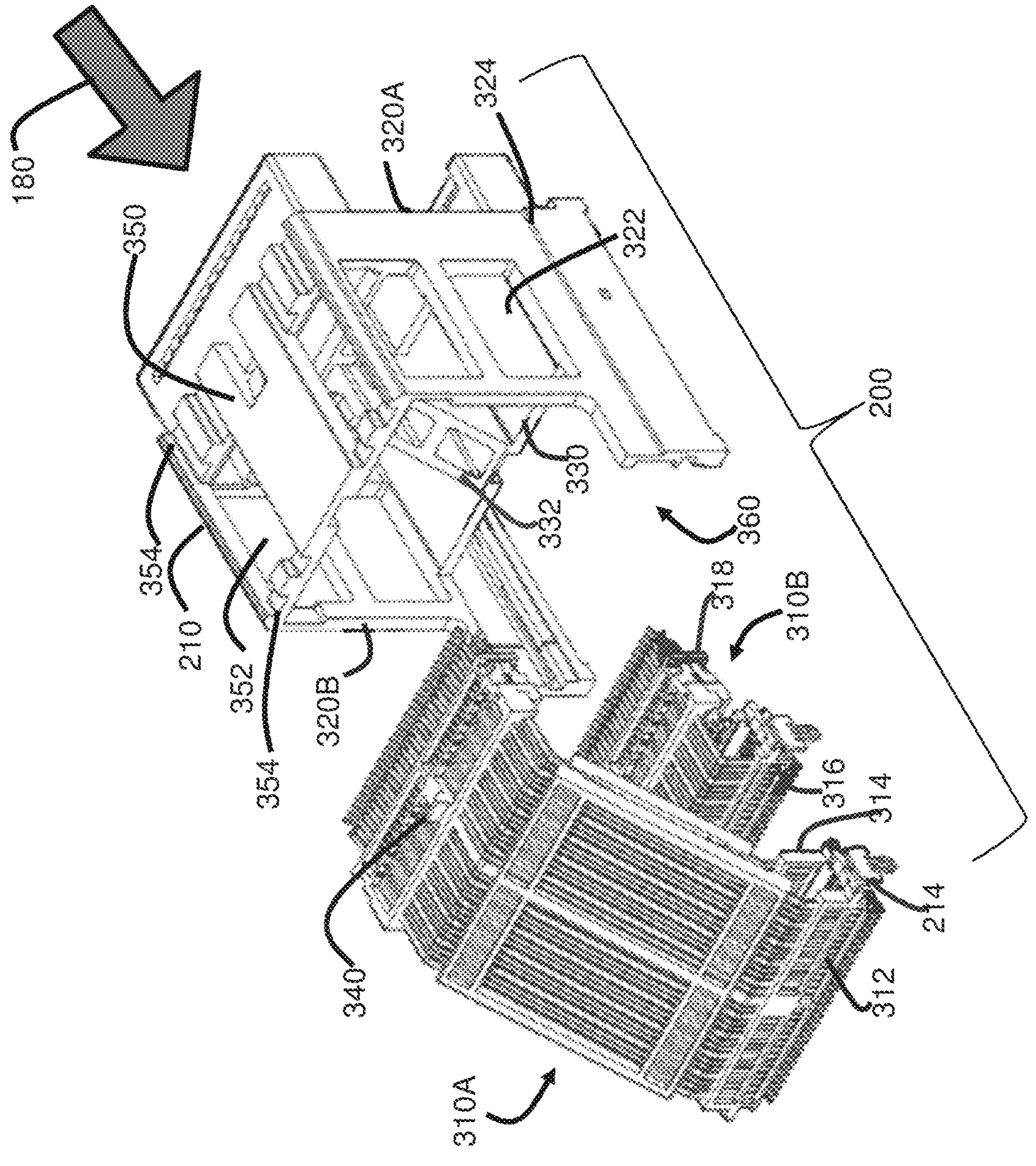
FIG. 3 is a partially exploded view of the stacked I/O connector of FIG. 2A, with lead frame assemblies removed from the housing.

Further details of connector 200 are shown in FIG. 3. As shown, housing 210 includes sidewalls 320A and 320B that bound a cavity 360. In this example, housing 210 as a substantially open rear portion such that air may readily flow out of cavity 362 the rear of connector 200.

Each of the sidewalls above segments 218 adjacent the mounting face has a web like structure to provide one or more openings 322 such that air may flow through sidewalls 320A and 320B. The portions of the sidewalls above segments 218 may be, for example, greater than 50% open.

In some embodiments, the openings 322 may be aligned with openings in a cage which may enclose connector 200. Alternatively or additionally, the sidewalls 320A and/or 320B may be setback from the widest dimension of connector 200 such that a cage, with vertical walls that abut against the widest point of connector, is separated from sidewalls 320A and/or 320B by an air channel. In the example of FIG. 3, a setback 324 is shown. In this example, setbacks 324 form the bottoms of channels between sidewalls 320A and 320B and vertical walls of a cage. Air may flow through the openings 322 and through these channels around the lead subassemblies 310A and 310B.

Conductive elements are integrated into connector 200 by insertion of an upper lead subassembly 310A and a lower lead subassembly 310B into cavity 360. In this example, upper lead subassembly 310A includes conductive elements that are inserted into slot portion 232A. Lower lead subassembly 310B contains conductive elements that are inserted into slot portion 232B. In the illustrated example, a slot in each slot portion serves as a mating interface to a plug. The slot has opposing surfaces and the mating contact portions of the conductive elements are exposed through those surfaces such that they can make contact with pads, or other contact surfaces, of a plug inserted into the slot.

Each of the lead subassemblies may be formed from multiple lead assemblies. Here, to lead assemblies are pressed together to form a lead subassembly. The lead subassemblies may be secured to each other before insertion into housing 210 or, in some embodiments, may be held next to each other when inserted into housing 210. In this example, upper outer lead assembly 312 and upper inner lead assembly 314 together form lead subassembly 310 A. Lower outer lead assembly 316 and lower inner lead assembly 318 together form lead subassembly 310 B.

Housing 210 may include a top face with a central member 350. Central member 350 may span only a portion of the width of the top face, leaving openings 352 on either side of central member 350. Openings 352 may enable air to flow from the interior of cavity 360 to the exterior of the housing through the top face. Central member may provide rigidity and/or mechanical strength to housing 210. Further, central member 350 may be shaped to engage with complementary features on lead subassembly 310A. A tab 340 on lead subassembly 310A may engage with central member 350 when lead assembly 310A is inserted into housing 210.

The top face may have a plurality of grooves 354. Here, the grooves extend parallel to the sidewalls 320A and 320B. Such grooves may provide airflow channels between the housing and a top wall of a cage enclosing connector 200. With such channels, air may flow through the cage and around the connector 200 with low resistance. Such air flow, for example, may follow a path through channels, such as 112B or 116B, and out a top or rear of the cage. As can be seen in FIG. 3, the grooves 354 are interrupted by openings 352. Accordingly, cooling air may follow more than one path through the connector. For example, air may enter channels between the top face of the connector 200 and a top of a cage enclosing connector 200 by flowing into grooves 354 adjacent the mating face of connector 200. Alternatively or additionally, air may enter those channels by flowing through openings 530 in the mating face and then through openings 352 in the top face of connector 200.

A platform 330 may span cavity 360 from sidewall 320A to sidewall 320B. Platform 330 is positioned adjacent slot portion 230 2B, and between slot portion 232B and slot portion 232A. Platform 330 may provide rigidity and/or mechanical strength to housing 210. Similar to central member 350, platform 330 may be shaped to engage with complementary features on lead subassembly 310B. A tab (not visible in FIG. 3) on lead subassembly 310B may engage with platform 330 when lead assembly 310B is inserted into housing 210.

Further rigidity and/or mechanical strength may be provided for housing 210 through support member 332, which extends from a central portion of platform 330. Support member 332 may have openings through it, allowing air to flow from mating face 230 into cavity 360 through support member 332.

Figure 4:
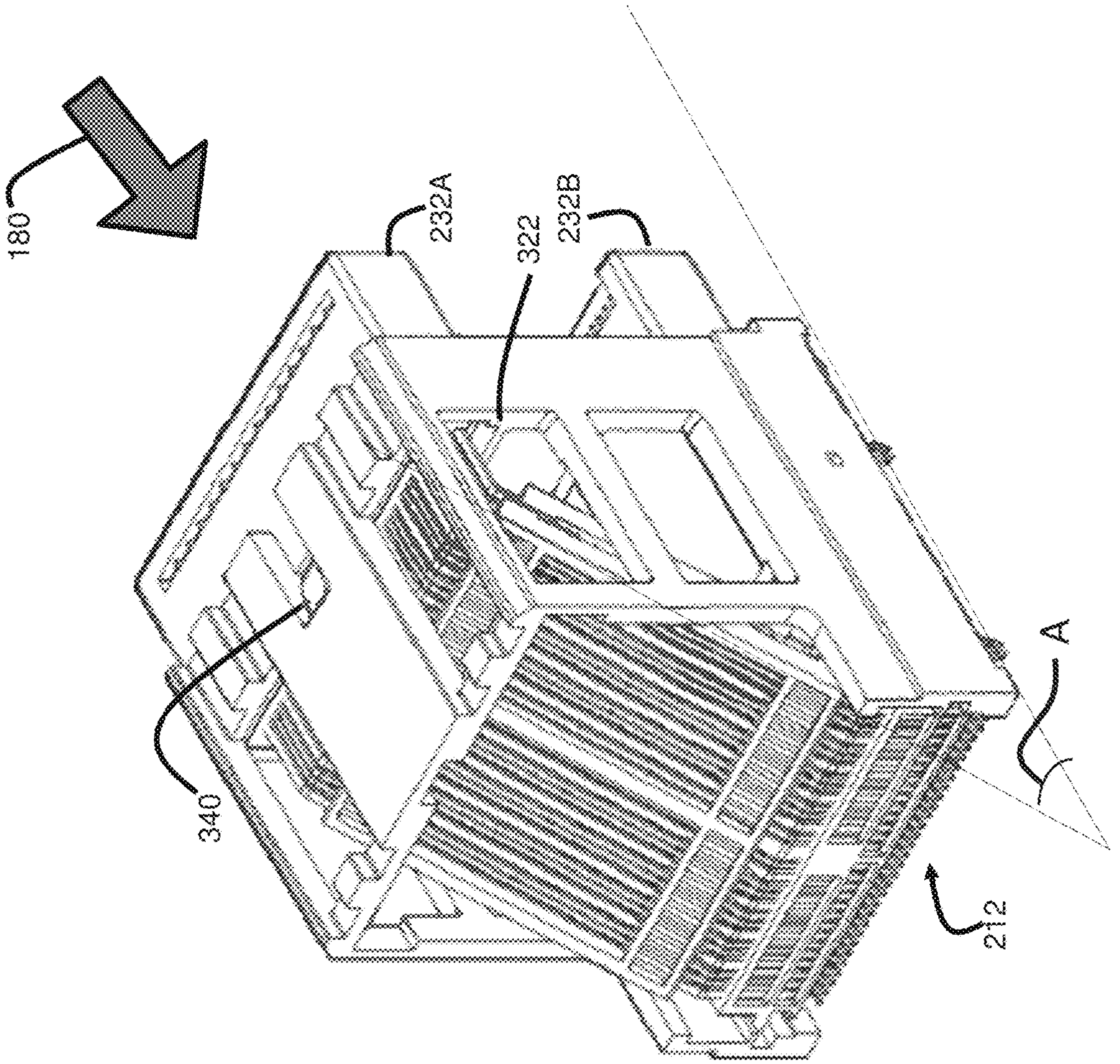
FIG. 4 is a rear, side perspective view of the stacked I/O connector of FIG. 2A, illustrating the angle, A, of the intermediate portions of upper lead frame assemblies relative to a plane of the mounting interface.

FIG. 4 illustrates further detail of connector 200. In FIG. 4, an intermediate portion of lead subassembly 310A is visible. The intermediate portion is angled, at an angle A, relative to mounting face 212. In contrast, as visible in FIG. 3, an intermediate portion of lead subassembly 310B is parallel with mounting face 212. Accordingly, the intermediate portion of lead subassembly 310A may be angled, at the angle A, relative to the intermediate portion of lead subassembly 310B. As can be seen in FIG. 4, the lead subassembly 310A results in opposing ends of the lead subassembly aligned with openings 322. Air flowing through the connector 200 may experience lower resistance than in a connector with solid sidewalls or without an angled lead subassembly, because the air may flow into openings 322 and around the ends of lead subassembly 310A.

Figure 5B:
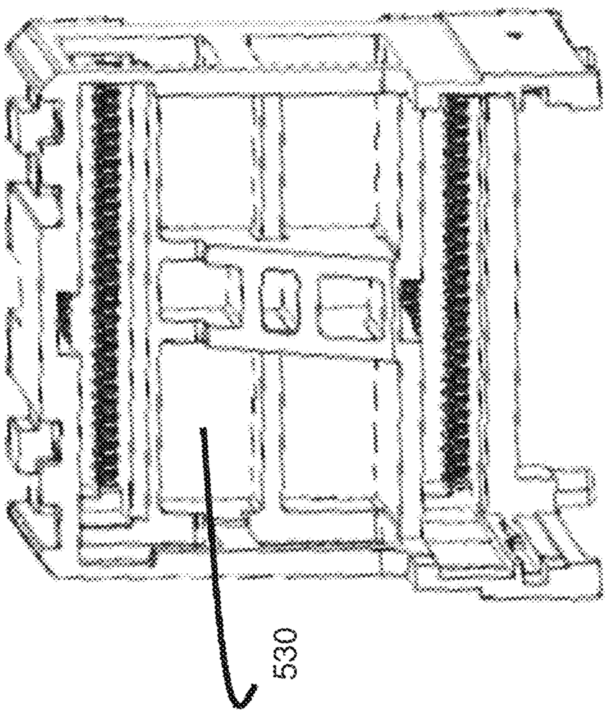
FIG. 5B is a rear, side view of the housing of FIG. 3, without the lead frame assemblies.
Figure 5A:
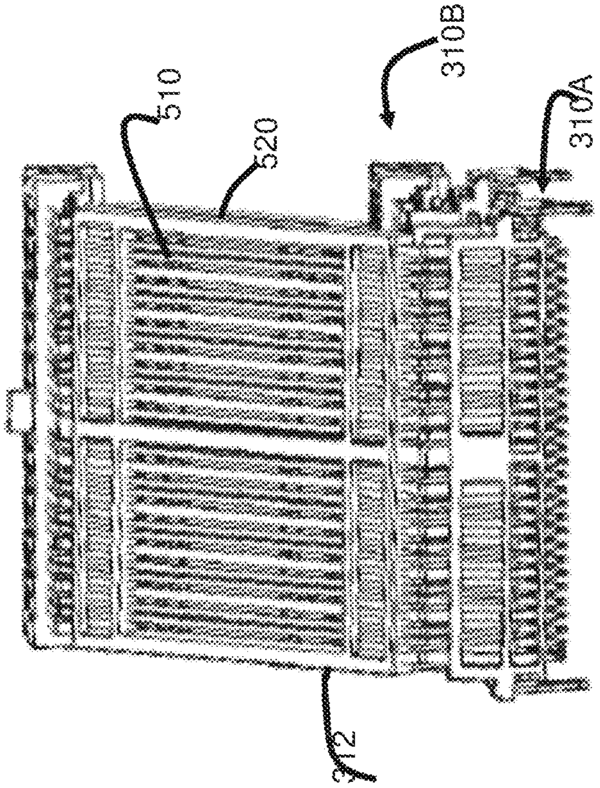
FIG. 5A is a rear, side view of the lead frame assemblies of FIG. 3.

FIG. 5A in FIG. 5B illustrate components of connector 200 from the rear. In this view, it can be seen that the components of connector 200 are configured to allow air to flow through connector 200 from the front to the rear. FIG. 5A illustrates a lead subassemblies 310A and 310B, with lead assembly 312 visible in this view.

Lead assembly 312 contains multiple conductive elements 510 held in the one or more insulative portions 520. Lead assembly 312 may be formed, for example, by insert molding the insulative portions 520 around a lead frame. The individual conductive elements 510 may be held in the lead frame with tie bars (e.g. 930, FIG. 9), which may be severed after the insert molding operation. The conductive elements 510 are held in a row orientation, spanning the cavity 360 from sidewall 320A to the opposing sidewall 320B. As adjacent conductive elements 510 in a row are separated physically from one another so as to provide electrical isolation between the conductive elements, there are spaces between the conductive elements through which air may flow, even when lead subassemblies 310A and 310B are inserted into cavity 360.

Lead assemblies 314, 316 and 318 may have a similar construction.

The back side of mating face 230 of connector 200 is visible in FIG. 5B. As can be seen, a substantial portion of the mating face 230 between slot portions 232A and 232B is open, as a result of holes 530. Thus, air may flow through mating face 230 into cavity 360. As described above in connection with FIGS. 1A and 1B, cooling air may be drawn into a cage 110 or 110B to cool transceivers inserted into the cage. In contrast to a conventional design in which a stacked connector at the rear of the cage blocks airflow from exiting the cage, connector 200 may provide a substantially lower resistance to the flow of air for cooling transceivers inserted into the cage. The holes 530 may be aligned with a channel of the cage, such as second channel 114 (FIG. 1), through which air is intended to flow. Thus, air flowing through the cage to cool the transceivers may pass through mating face 230 into cavity 360.

As the back, sides and top of insulative housing 210 also include substantial openings, air flowing into cavity 360 may readily exit cavity 360 through any or all of these openings to the exterior of the housing, where it might be vented from the system or otherwise handled to dissipate heat.

Figure 6B:
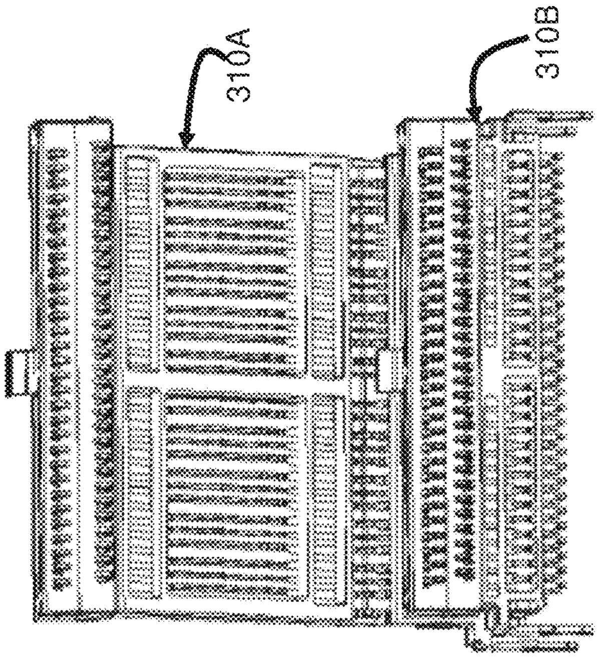
FIG. 6B is a front view of the lead frame assemblies of the stacked I/O connector of FIG. 2A, without the housing.
Figure 6A:
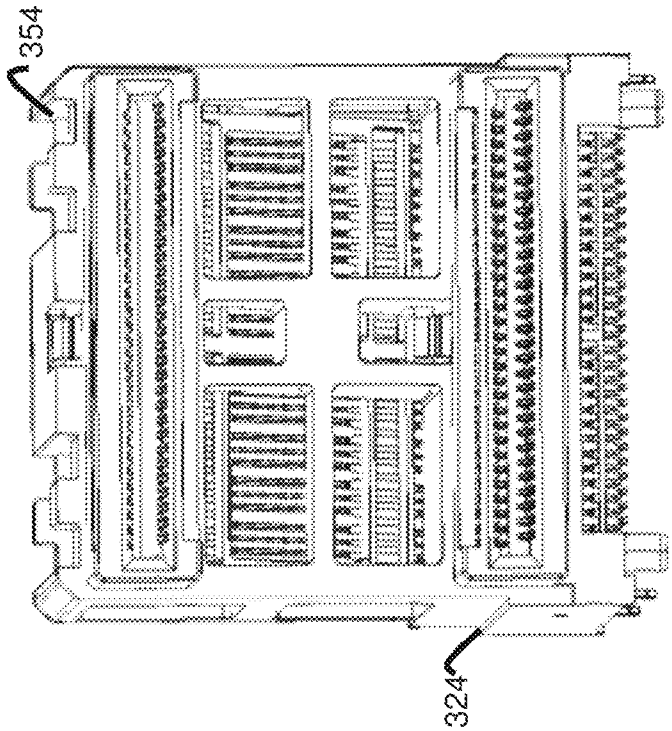
FIG. 6A is a front view of the stacked I/O connector of FIG. 2A.

FIG. 6A illustrates connector 200 from the front, showing that a relatively large percentage of the mating interface between slots is open. FIG. 6B illustrates lead subassemblies 310A and 310B.

Figure 7:
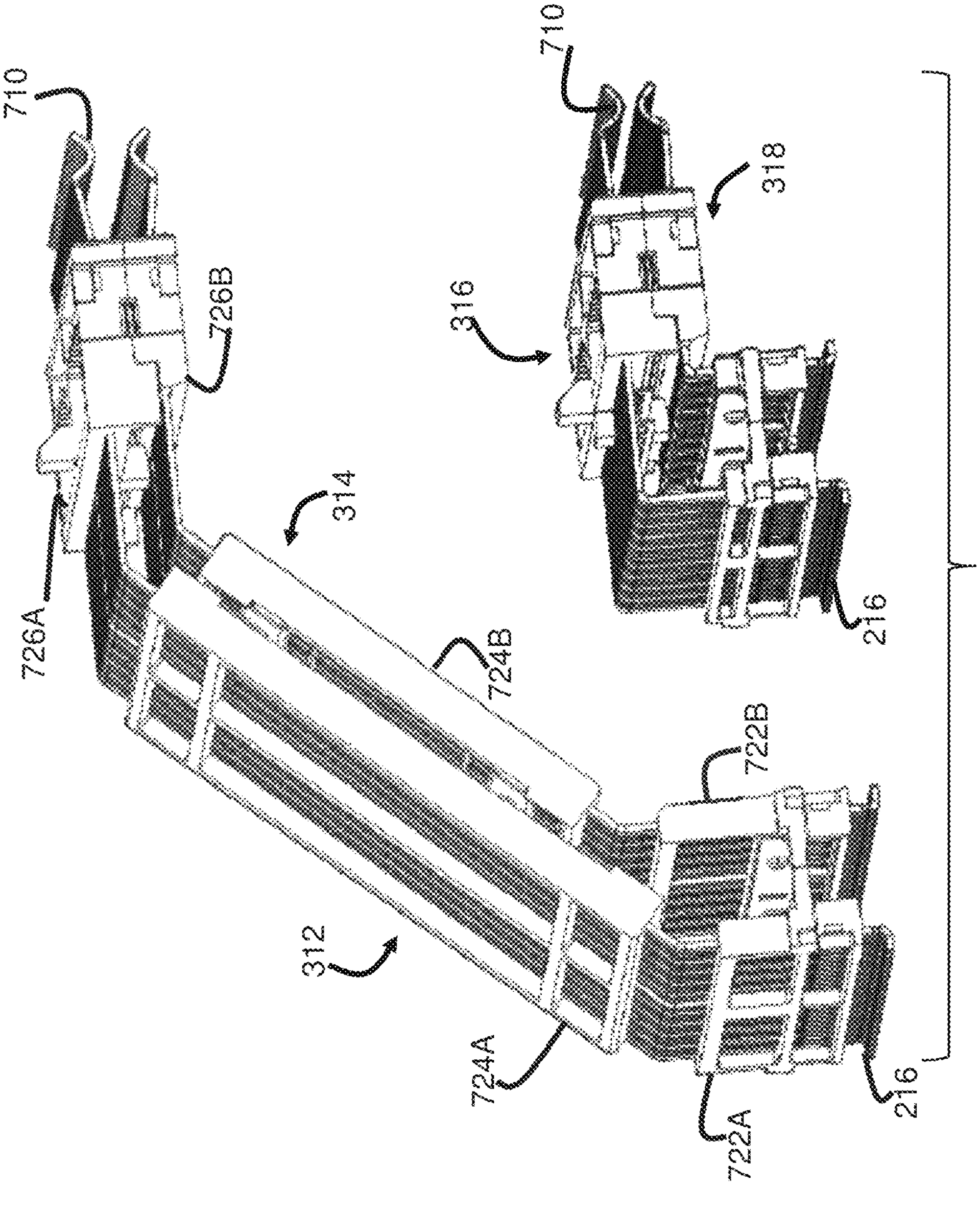
FIG. 7 is a side view of the lead frame assemblies of the stacked I/O connector of FIG. 2A without the housing.

FIG. 7 illustrates further details of the construction of the exemplary lead subassemblies 310A and 310B. Each of the lead subassemblies is formed from two lead assemblies, each with a row of conductive elements held in an insulative members. Lead assembly 312 has a row of conductive elements held in insulative portions 722A, 724A, and 726A. Contact tails may be exposed at one end of the lead subassembly, and mating portions 710 may be exposed at the other end. The insulative portions have a frame-like construction, providing support around their peripheries, with an open area that does not block the spaces between conductive elements such that, in some embodiments, air may flow through the lead assembly.

One or more of the insulative portions 722A, 724A, and 726A may include features that engage insulative housing 210. Insulative portion 726A, for example, may have features that engage complementary features in or near slot portion 232A. Insulative portion 722A may have features that engage housing 210 at or near segments 218.

Corresponding insulative portions 722B, 724B, and 726B may hold together conductive elements forming lead assembly 314. Similarly, insulative portions may hold in a row conductive elements in lead subassemblies 316 and 318.

Figure 8:
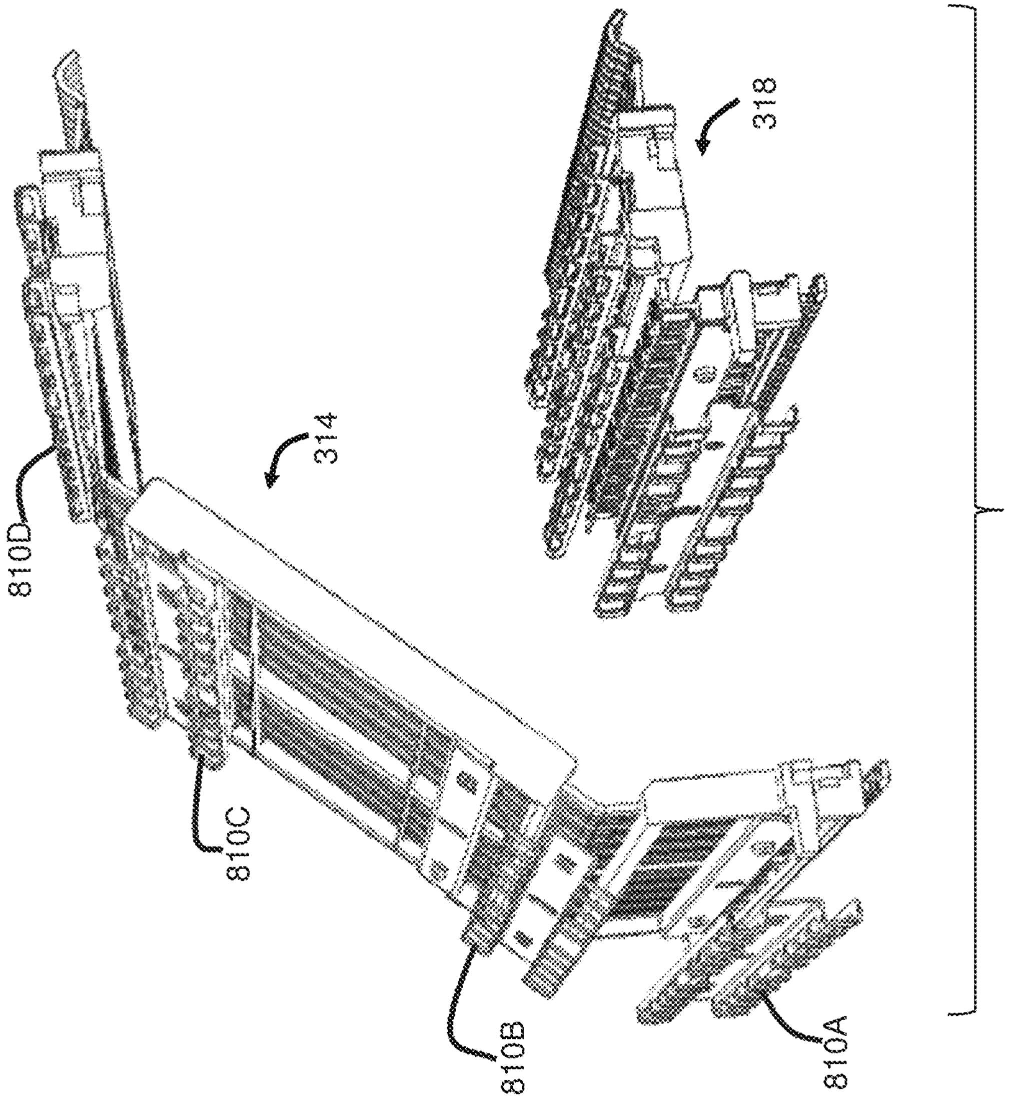
FIG. 8 is a side view of the lead frame assemblies of FIG. 7, with the outer, upper lead frame assembly and the outer, lower lead frame assembly removed.

FIG. 8 illustrates that each of the lead subassemblies may include members that are at least partially conductive. These members may be positioned to interconnect selected ones of the conductive elements in a lead assembly. For example, one or more of the lead subassemblies may have one or more welded metal shorting bars to improve electrical performance of the connector. FIG. 8 illustrates lead subassembly 310A without lead assembly 312, such that lead assembly 314 along with members 810A, 810B, 810C, 810D, positioned to make connections between selected conductive elements in lead assembly 312, are visible.

Members 810A, 810B, 810C, 810D are positioned to make connections to the conductive elements of lead assembly at locations along its length where they are effective to improve integrity of high speed signals in lead assembly 312. For example, the number and spacing of conductive elements may be selected such that the maximum spacing between conductive elements is less than one half of the wavelength of the highest frequency in the designed operating range of the connector. The conductive element may also positioned so as not to block air flow through the lead assembly. The positioning of these members may be a compromise between meeting the goals of improving signal integrity and not blocking airflow. The members may be positioned for example so as not to be evenly spaced along the length of the conductive elements to avoid a member in the intermediate portions aligned with openings 530, for example. Exemplary positions that meet these criteria are shown in FIG. 8.

Likewise, lead subassembly 318 is shown without lead assembly 316 such that members that are at least partially conductive (not numbered) positioned to make contact with selected conductive elements in lead assembly 316 are visible. In contrast to the four members 810A, 810B, 810C, 810D that contact the conductive members along the length of the conductive elements in lead assembly 312, there are two such members configured to contact conductive elements of lead assembly 316. Similarly, members that are at least partially conductive are positioned to contact select conductive elements of lead assembly 314 and lead assembly 318.

In some connectors, the configuration of conductive elements in each of the rows of conductive elements in the connector may be the same. In such a configuration, the members that contact selective ones of the conductive elements in a row may have the same configuration. For example, the conductive elements in a row may be configured in a repeating signal-signal-ground (S-S-G) arrangement, and each member may be configured to contact grounds. In such a configuration, the members may have projections that align with the ground conductors. The members may be attached to a lead assembly with the projections contacting or extending towards and in close proximity with the ground conductors. In the illustrated embodiment, the projections may be welded to the ground conductors.

Figure 9C:
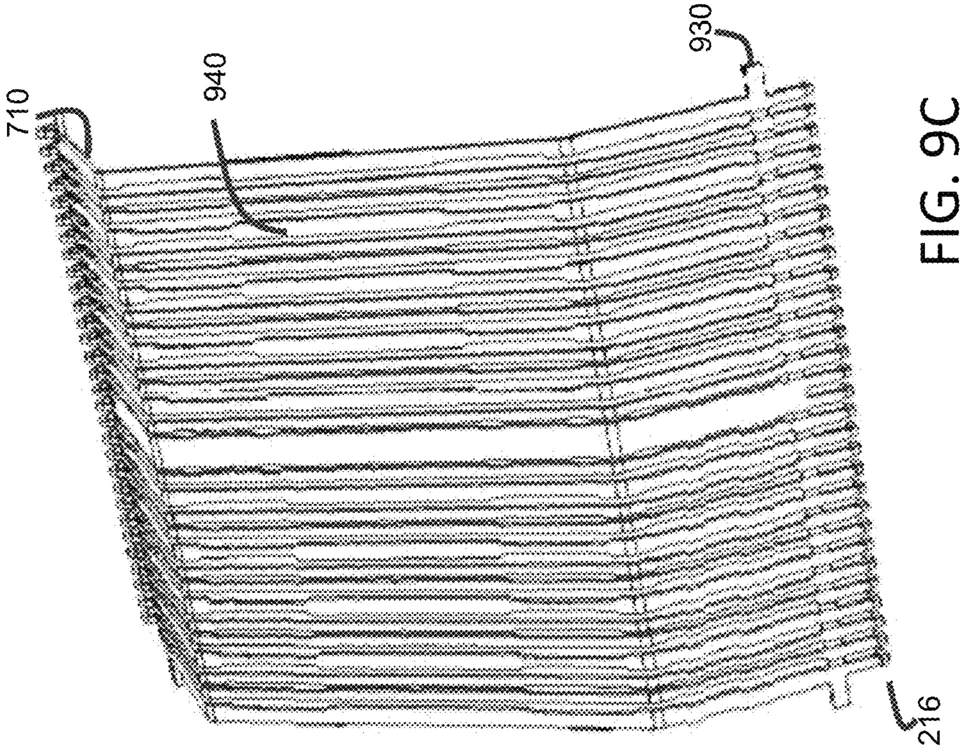
FIG. 9C is a perspective view of conductive elements of the inner, upper lead frame assembly of FIG. 7.
Figure 9A:
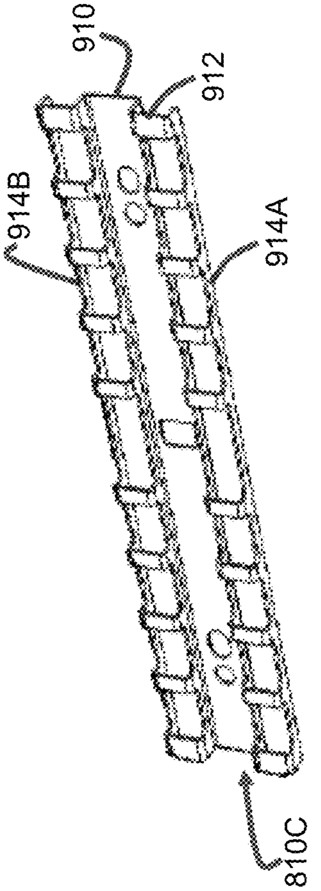
FIG. 9A is a perspective view of a member that is at least partially conductive with projections configured to project towards ground conductors of the outer, upper lead frame assembly.

FIG. 9A illustrates an exemplary member 810C. In this example, the projections 912 are U-shaped. The projections are held together by a body, here shaped as a bar 910. A member with the illustrated configuration may be formed from a sheet of metal that is stamped and then formed.

Member 810C is shown oriented so as to attach to conductive elements in lead assembly 312. As can be seen, each of the lead assemblies holds a row of conductive elements and the body of the member is elongated in a direction of the row. Such a configuration enables the body to be electrically connected to multiple ones of the conductive elements in the row. FIG. 9C illustrates conductive elements before being inserted molded into lead assembly 312. In this example, there are two groups of conductive elements, each with a first type of conductive element and a second type of conductive element. Every third conductive element may be of the second type and may have a wider portion 940, which is wider than the other portions of the second type conductive elements and wider than the first type of conductive element. The second type conductive element may be a ground conductor and the first type may serve as signal conductors. The projections 912 may be welded to the wider portion 940.

Welding may provide for low inductance connections between ground conductors, which may increase the frequency of ground system resonances within the connector, thereby enabling high frequency operation of the connector. Relatively wide and long welded joints may be formed between projections 912 and the ground conductors, which contribute to low inductance connections. The joints may be, for example, greater than 0.4 mm long, such as between 0.4 and 1 mm long, and greater than 0.2 mm wide, such as between 0.2 and 0.4 mm wide.

Low inductance may also be provided by relatively wide conducting paths between adjacent ground conductors. In the illustrated embodiment, adjacent ground conductors are coupled through bar 910 as well as side strips 914A and 914B. The structures forming conductive paths between adjacent connections to ground conductors may collectively have an average width, in a direction parallel to the direction in which the ground conductors extend, between 1 mm and 5 mm, such as between 1.5 mm and 3.5 mm, or 2 mm and 3 mm in some embodiments.

Moreover, the separation between bar 910 and the signal conductors may be set by the height of the projections 912, which may be stable. As a result, the impedance along the signal conductors does not vary in operation, avoiding degradation in signal integrity that can come with variations in impedance.

Further, reliable connections may be made in a confined space and without the need for gold or other precious metal coatings, such as might be used with a ground bar connected via spring fingers. Clipping or clamping structures may be included to hold the lead assemblies 312 and 314 or 316 and 218 together, if the connections to ground conductors is made via spring fingers. In embodiments in which connections between ground conductors are made via welding, the clipping or clamping features may be omitted, saving space.

Further, avoiding the use of spring fingers eliminates the need to shape the connection points to generate a required spring force, which may lead to long and/or narrow interconnections, that undesirably increase the inductance.

Figure 9B:
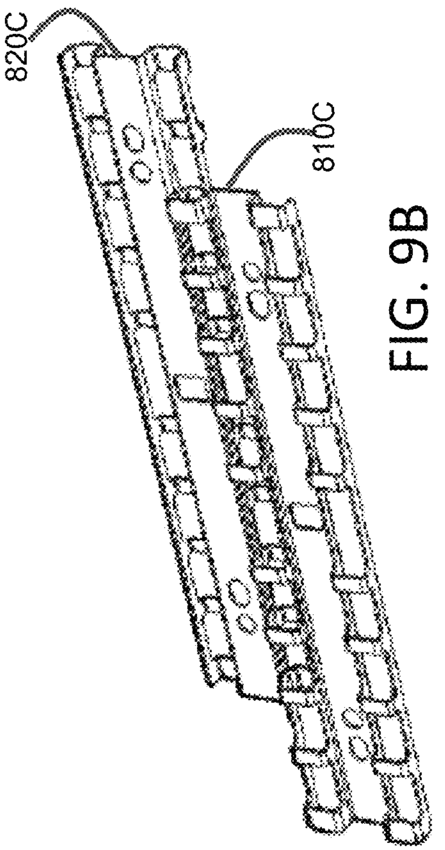
FIG. 9B is a perspective view of two members that are at least partially conductive with projections configured to project towards ground conductors of the outer, upper lead frame assembly and the inner, upper lead frame assembly.

FIG. 9B illustrates in connection with a member 810C, a similar member 820C. Member 820C may be the same as member 810C, except oriented to connect to conductive elements in lead assembly 314.

Using a connector with some or all of the features described above for connector 200 may enable a system (such as electronic system 100) to operate according to a desirable method. The electronic system 100 may be disposed in an ambient environment. The electronic system 100 may include an enclosure 140 and within the enclosure 140, a cage 110, the cage 110 including a stacked first channel 112, second channel 114, and third channel 116. However, it should be appreciated that a cage may be configured with more or fewer channels. In a stacked connector assembly, for example, there may be two channels, such as channels 112B and 116B (FIG. 1B), each designed to receive a transceiver, without an intervening middle channel, such as channel 114.

The method according to the embodiment includes transmitting and/or receiving optical signals with a transceiver disposed within the first channel 112, and/or transmitting and/or receiving optical signals with a transceiver disposed within the third channel 116, in each case at data rate in excess of 110 Gbps, such as 112 Gbps or greater. In some embodiments the transceivers in each of the first channel 112 and the third channel 116 may consume at least 1 W, less than 15 W, or, in some embodiments, between 1 and 15 W. In some embodiments, the transceivers may consume 1.5 W, 3.5 W, 7 W, 8 W, 10 W, 12 W, 14 W, or greater than 14 W. Such power dissipation is consistent with a OSFP transceiver. The transceivers may have integrated heat sinks, such that heat generated by the transceiver is dissipated by air flowing through the channel that receives the transceiver. A connector as described above may facilitate this airflow to provide suitable cooling.

The method according to the embodiment includes flowing air through a cage with a fan 150 disposed within the enclosure 140. The fan 150 may be operating at a static pressure of at least 0.8 inches of water (IW), less than 1.5 IW, or between 0.8 and 1.5 IW. Heat is dissipated from the transceivers in the first channel 112 and/or the third channel 116 such that a temperature rise of both transceivers relative to an off state of the transceivers is less than 25 degrees C. With such a configuration, the heat dissipated from within the cage may be sufficient that this temperature rise may be achieved even with the electronic enclosure in an ambient environment of 25 degrees C. Sufficient cooling to provide temperature rises at or below this level may be achieved even without a middle channel, such as second channel 114, which may be omitted in some embodiments.

In one exemplary embodiment, the system is disposed in an ambient environment of 25 degrees C. The cage is formed from sheet metal bent into a suitable shape. The cage includes a two stacked channels, each configured to receive a OSFP transceiver. Each transceiver may consume 12 W of power. The fan is disposed within the enclosure and configured to operate at a static pressure of 1.0 IW. The airflow through the cage with a connector 200 in the cage may be sufficient to cool the transceivers such that the temperature rise of the transceiver in the first channel relative to an off state of the transceiver is 25 degrees C., or less. The temperature rise of the transceiver in the top channel relative to an off state of the transceiver is 25 degrees C., or less. Comparable temperature rise may be observed in the lower channel.

It should be understood that aspects of the disclosure are described herein with reference to certain illustrative embodiments and the figures. The illustrative embodiments described herein are not necessarily intended to show all aspects of the disclosure, but rather are used to describe a few illustrative embodiments. Thus, aspects of the disclosure are not intended to be construed narrowly in view of the illustrative embodiments. In addition, it should be understood that aspects of the disclosure may be used alone or in any suitable combination with other aspects of the disclosure.

Figure 10B:
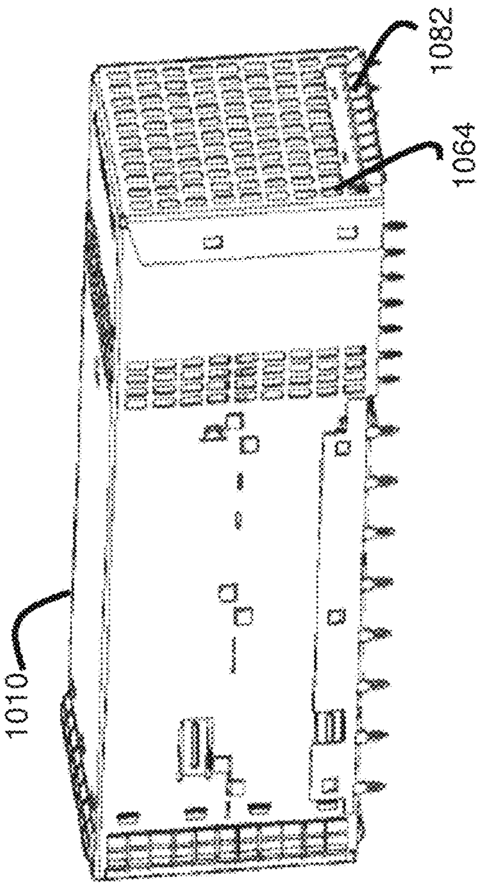
FIG. 10B is a rear, right side perspective view of the stacked 2×1 cage of FIG. 10A.
Figure 10A:
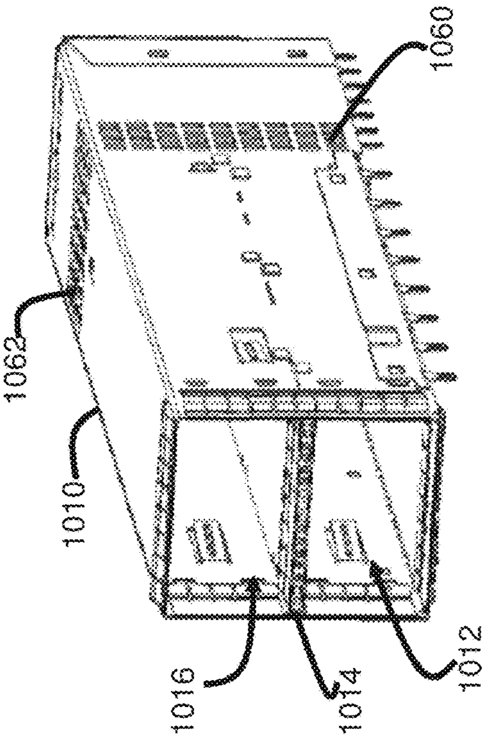
FIG. 10A is a front, right side perspective view of an exemplary embodiment of a stacked 2×1 cage.
Figure 10C:
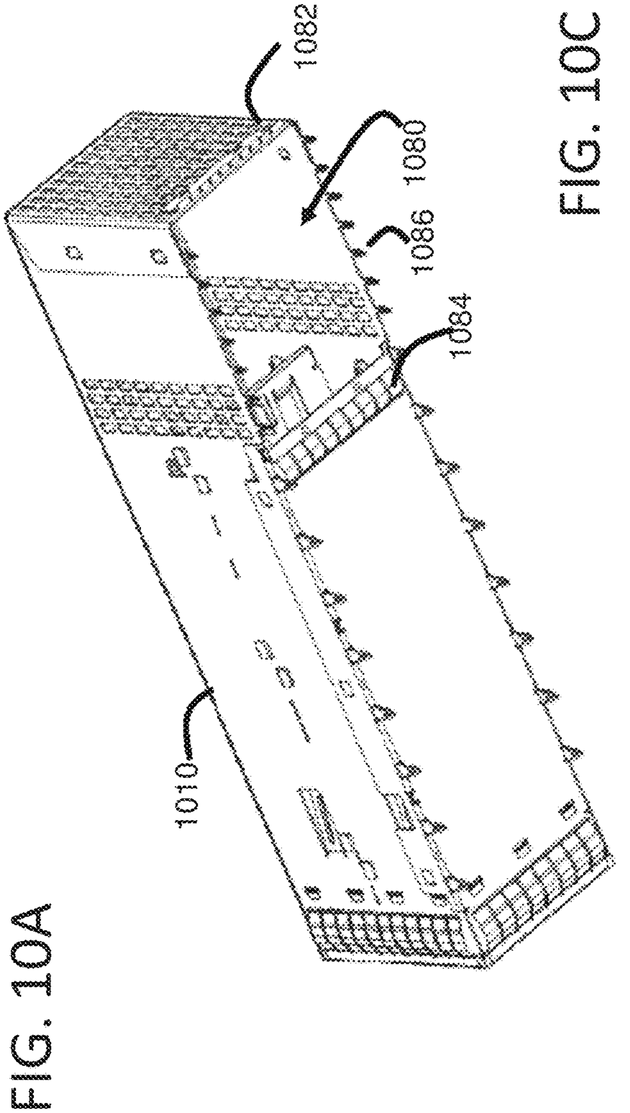
FIG. 10C is a rear, bottom, right side perspective view of the stacked 2×1 cage of FIG. 10A.

For example, FIGS. 10A, 10B and 10C illustrate an alternative embodiment of a stacked cage 1010, with channels 1012 and 1016, and middle channel 1014. In this example, cage 1010 includes holes 1060 in vertical sidewalls of the cage and holes 1062 in a top surface of the cage. Similar holes may be included in back face 1064.

FIG. 10C illustrates cage 1010 viewed from its mounting face. In this view, an opening 1080 in the mounting face is visible. In some embodiments, connector 200 may be surface mount soldered to pads on a surface of a printed circuit board, such as printed circuit board 130 (FIG. 1A). Cate 1010 may be placed over the connector 200, with connector 200 fitting within opening 1080. Pressfit tails 1086, extending from an edge of the side walls of cage 1010 may be pressed into ground vias of the printed circuit board, both securing the cage 1010 and grounding it.

In some embodiments, less interference may be provided with spring fingers, such as 1082 and 1084. These spring fingers may be cut from the same sheet of metal used to form other structures of cage 1010 or may be separately formed and attached to cage 1010. In this example, spring fingers 1082 and 1084 bound edges of opening 1080. In this example, they bound a forward edge and an opposing rear edge of opening 1080. A printed circuit board to which cage 1010 is mounted may have elongated surface pads, connected to ground structures within the printed circuit board, configured as strips that align with spring fingers 1082 and 1084. Thus, when cage 1010 is pressed onto the board, additional grounding is provided around the contact tails of the conductive elements of connector 200. Accordingly a printed circuit board to which connector 200 is mounted may include a connector footprint with a plurality of rows of pads, each configured to receive contact tails from one of the lead assemblies of connector 200. A ground strip may be parallel with, and at either or both sides of, the plurality of rows of pads.

Figure 11A:
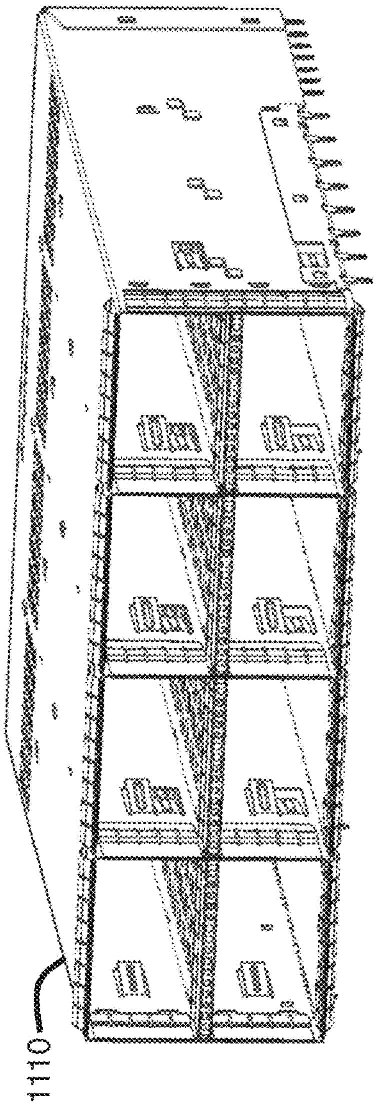
FIG. 11A is a front, right side perspective view of an exemplary embodiment of a ganged 2×4 cage.
Figure 11B:
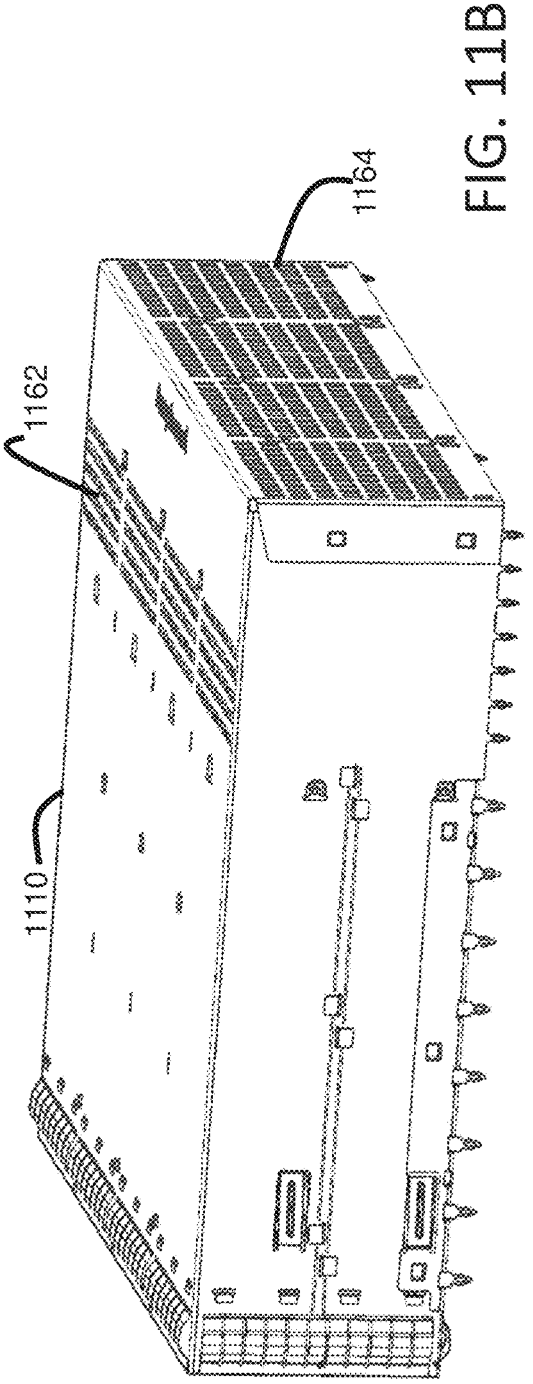
FIG. 11B is a rear, right side perspective view of the ganged 2×4 cage of FIG. 11A.

FIGS. 11A and 11B illustrate a further embodiment of a cage that may be used with connector 200. In this example, cage 1110 is a ganged cage in a 4×2 configuration. Cage 1110 has four segments, each generally configured like cage 1010, with channels, top holes 1162 and holes in a rear surface 1164. A connector 200 may be positioned within each of the segments. Features as described herein may provide multiple air flow paths through the channels of the cage where transceivers may be installed and then out of the cage. These airflow paths may include paths that enable air to flow partially around the connector and out holes on the top of the cage or around the connector and out of holes at the rear of the cage.

In a stacked configuration, the sides of some or all of the segments may be blocked by an adjacent segment. Accordingly, in the illustrated embodiment, the airflow paths may not include a path exiting the cage through side holes such as 1060. Nonetheless, adequate cooling may be provided as air may flow around the connector through channels between the sidewalls of the connector housing and the vertical walls of the cage or partially through and partially around the connector, such as by flowing through openings 530 in the front of the housing and through side openings 322 either out of the housing into a channel between housing and the cage or around the lead assemblies and out of the rear of the connector. As a result, a connector configured as described herein with a housing with multiple openings and/or that provides multiple channels between the housing and the cage, may enable efficient cooling of transceivers mated with the connector.

As an example of another variation, members 810A, 810B, 810C, 810D are described as being at least partially conductive. In the illustrated embodiment, those members are conductive, being made from metal. In other embodiments, the members may be or include lossy material such that the members are partially conductive. In some embodiments, lossy material may be used instead of or in addition to metal to form members such as 810A, 810B, 810C and 810D. Lossy material, such as lossy plastic, for example, may be molded over or otherwise adhered to metal members. Alternatively, lossy material may be mechanically fixed to the metal members, such as by pressing barbs from the metal members into the lossy material.

Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest.

Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000 Siemens/meter. In some embodiments material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the techniques described herein are not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

In yet other embodiments, lossy material may be integrated with lossy members 810A, 810B, 810C, 810D, as are shown attached to lead assembly 312, and other similar members attached to other lead assemblies, by coating lossy material on the members. The coating may be applied as an adhesive. The adhesive may serve as a binder and may be filled with particles that make the adhesive lossy. Alternatively, other binders may alternatively or additionally be used. Similarly, lossy material may be applied as an ink or may be applied as a preform that is adhered to the metal member. Alternatively, a lossy structure may be mechanically attached to the metal member, such as via a snap fit, interference fit or other suitable type of mechanical connection. The lossy structure may be formed separately, such as via molding, and then mechanically attached to the metal member.

For purposes of this patent application and any patent issuing thereon, the indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

The foregoing description of various embodiments are intended merely to be illustrative thereof and that other embodiments, modifications, and equivalents are within the scope of the invention recited in the claims appended hereto.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As a specific example of a possible variation, embodiments are described in which connections between a transceiver and a connector are electrical. Embodiments are possible in which the connections are optical.

As another example, a connector is illustrated with a web-like connector housing. The illustrated housing has openings in the front face, back, both sides and top. Such a configuration provides multiple air flow paths through the connector, such as through the front face and out the top of the connector, through the front face and out both sides or through the front face and the lead subassemblies and out the back. Connectors may be implemented such that passages are present for airflow along one or more of these paths.

The resistance to airflow along each path may depend on other components of the system in which the connector is used. Cage 110B (FIG. 3) has airflow holes aligned with the top, sides and rear of a connector in the cage, such that air may flow along all of these paths if the connector is configured with airflow passages as described herein. In other embodiments, the cage may not have openings in the top, and there may be no airflow out of the top of the connector, for example. In other embodiments, the connector may be implemented with only a subset of the airflow passages described herein. For example, there may be openings in only one side of the connector housing.

As another example of a variation, in some embodiments, contact tails were illustrated as surface mount elements. However, other configurations may also be used, such as press fit "eye of the needle" compliant sections that are designed to fit within vias of printed circuit boards, solderable pins, etc., as aspects of the present disclosure are not limited to the use of any particular mechanism for attaching connectors to printed circuit boards.

Further, a connector as illustrated herein is configured for mating with a transceiver according to the OSFP standard. Techniques as described herein may be used for connectors configured to operate with other standards, such as QSFP-DD or other SFP standards, or for other I/O connectors even if not specifically configured to operate in connection with an SFP standard. While stacked connectors are illustrated, one or more techniques may be applied to single port I/O connectors. Conductive members may be welded to ground conductors as described herein in a single port connector, for example. Moreover, one or more of the techniques described herein might be applied in connectors configured other than I/O connectors, such as backplane connectors.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. An electrical connector comprising:

a housing configured to receive a mating connector;

a plurality of subassemblies, each subassembly of the plurality of subassemblies comprising:

an insulative portion;

a plurality of conductive elements held by the insulative portion, wherein:

each conductive element of the plurality of conductive elements comprises a mating portion, a contact tail and an intermediate portion joining the mating portion and the contact tail;

the mating portions of the plurality of conductive elements are positioned in a row in a row direction;

the plurality of conductive elements comprises a plurality of signal conductors and a plurality of ground conductors;

a first conductive member extending in the row direction and welded to intermediate portions of ground conductors of the plurality of ground conductors;

a second conductive member extending in the row direction and welded to the intermediate portions of ground conductors of the plurality of ground conductors, wherein the first conductive member and the second conductive member are welded to intermediate portions of the ground conductors of the plurality of ground conductors at different points along a length of the ground conductors of the plurality of ground conductors.

2. The electrical connector of claim 1, wherein:

the first conductive member comprises a sheet of metal formed with a plurality of projections;

the second conductive member comprises a sheet of metal formed with a plurality of projections;

the plurality of projections of the first conductive member are welded to the intermediate portions of respective ground conductors of the plurality of ground conductors; and the plurality of projections of each of the second conductive member are welded to the intermediate portions of respective ground conductors of the plurality of ground conductors.

3. The electrical connector of claim 1, wherein:

the intermediate portions of ground conductors of the plurality of ground conductors comprise wide portions wider than other portions of the ground conductors;

the first conductive member is welded to the wide portions of the ground conductors of the plurality of ground conductors; and the wide portions are wider than the plurality of signal conductors.

4. The electrical connector of claim 1, further comprising:

at least one additional conductive member welded to the intermediate portions of ground conductors of the plurality of ground conductors.

5. The electrical connector of claim 1, wherein:

the first conductive member comprises a body elongated in the row direction;

the first conductive member comprises a plurality of projections held together by the body; and the plurality of projections are welded to the intermediate portions of the ground conductors of the plurality of ground conductors.

6. The electrical connector of claim 5, wherein:

the plurality of projections are U-shaped.

7. The electrical connector of claim 1, wherein:

welds between the first conductive member and the intermediate portions of the ground conductors have a length in excess of 0.2 mm.

8. The electrical connector of claim 7, wherein:

the welds between the first conductive member and the intermediate portions of the ground conductors enable low inductance connections among the ground conductors.

9. The electrical connector of claim 8, wherein:

the welds between the first conductive member and the intermediate portions of the ground conductors have a length in excess of 0.4 mm.

10. The electrical connector of claim 9, wherein:

the first conductive member forms conductive paths between adjacent ones of the ground conductors having an average width between 1.5 mm and 3.5 mm.

11. The electrical connector of claim 1, wherein:

at least some of the contact tails of the conductive elements of the plurality of conductive elements are configured for mounting to a circuit board.

12. An electrical connector comprising:

a housing configured to receive a mating connector;

a plurality of conductive elements, wherein:

each conductive element of the plurality of conductive elements comprises a mating portion, a contact tail and an intermediate portion joining the mating portion and the contact tail;

the mating portions of the plurality of conductive elements are positioned in a row in a row direction;

the plurality of conductive elements comprises a plurality of signal conductors and a plurality of ground conductors;

intermediate portions of ground conductors of the plurality of ground conductors comprise wide portions wider in the row direction than other portions of the ground conductors, wherein the wide portions are wider in the row direction than the plurality of signal conductors;

a first conductive member welded to the wide portions of the ground conductors of the plurality of ground conductors.

13. The electrical connector of claim 12, further comprising:

at least one additional conductive member welded to the intermediate portions of ground conductors of the plurality of ground conductors.

14. The electrical connector of claim 12, wherein:

the first conductive member comprises a body elongated in the row direction;

the first conductive member comprises a plurality of projections held together by the body;

the plurality of projections are welded to the wide portions of the ground conductors of the plurality of ground conductors; and the plurality of projections are U-shaped.

15. The electrical connector of claim 12, wherein:

the plurality of signal conductors comprises a pair of signal conductors;

a first projection of the first conductive member is welded to a first ground conductor of the plurality of ground conductors on a first side of the pair of signal conductors; and a second projection of the first conductive member is welded to a second ground conductor of the plurality of ground conductors on a second side of the pair of signal conductors.

16. The electrical connector of claim 12, wherein:

welds between the first conductive member and the wide portions of the ground conductors have a length in excess of 0.2 mm; and the welds between the first conductive member and the wide portions of the ground conductors enable low inductance connections among the ground conductors.

17. The electrical connector of claim 16, wherein: the welds between the first conductive member and the wide portions of the ground conductors have a length in excess of 0.4 mm.

18. The electrical connector of claim 17, wherein: the first conductive member forms conductive paths between adjacent ones of the ground conductors having an average width between 1.5 mm and 3.5 mm.

19. The electrical connector of claim 12, further comprising: a lossy member electrically and mechanically coupled to the first conductive member.

20. An electrical connector comprising:

a housing configured to receive a mating connector;

a plurality of conductive elements, wherein:

each conductive element of the plurality of conductive elements comprises a mating portion, a contact tail and an intermediate portion joining the mating portion and the contact tail;

the mating portions of the plurality of conductive elements are positioned in a row; and the plurality of conductive elements comprise pairs of first conductive elements and second conductive elements disposed between pairs of the first conductive elements; and at least one conductive member welded to intermediate portions of the second conductive elements, wherein:

the at least one conductive member comprises a sheet of metal formed into a plurality of projecting portions joined by body portions, the projecting portions and the body portions having parallel surfaces offset from one another, with the surfaces of the projecting portions being aligned with respective second conductive elements and the surfaces of the body portions aligned with and offset from respective pairs of first conductive elements;

the surfaces of the plurality of projecting portions of the at least one conductive member are welded to the intermediate portions of the respective second conductive elements; and the at least one conductive member is welded to intermediate portions of the second conductive elements at at least two points along a length of the second conductive elements.

21. The electrical connector of claim 20, wherein: the body portions of the at least one conductive member are separated from the intermediate portions of the first conductive elements by a distance established by the projecting portions.

22. The electrical connector of claim 21, wherein: the body portions of the at least one conductive member provide conducting paths between adjacent second conductive elements having an average width between 1.5 mm and 3.5 mm.

23. The electrical connector of claim 21, wherein: the plurality of projecting portions are welded to the intermediate portions of respective second conductive elements at joints having a length greater than 0.2 mm.

24. The electrical connector of claim 23, wherein: the joints are greater than 0.4 mm.

25. The electrical connector of claim 20, wherein:

the plurality of conductive elements are arranged in a row in a row direction;

the plurality of projecting portions of the at least one conductive member are U-shaped, such that the sheet of metal comprises portions alternating with the U-shaped projecting portions.

26. The electrical connector of claim 20, wherein:

the plurality of conductive elements comprise a lead assembly;

the lead assembly comprises an insulative frame with an open area molded around the plurality of conductive elements; and the at least one conductive member is disposed within the open area of the insulative frame.

27. The electrical connector of claim 26, wherein:

the lead assembly is a first lead assembly;

the at least one conductive member comprises at least a first conductive element; and the electrical connector further comprises a second, like lead assembly, with a second conductive member alike to the first conductive element.

28. The electrical connector of claim 20, wherein:

the mating portions of the plurality of conductive elements are positioned in the row in a row direction; and the sheet of metal is formed into multiple pairs of projection portions and body portions of the sheet of metal are aligned in the row direction with the pairs of projecting portions.

29. The electrical connector of claim 20, wherein:

the sheet of metal comprises a first projecting portion between a first body portion and a second body portion, the first projecting portion comprises a first segment extending from the first body portion toward the respective second conductive elements, a second segment parallel to the respective second conductive elements, and a third segment extending from the second body portion toward the respective second conductive elements.

30. The electrical connector of claim 20, wherein:

the intermediate portions of the second conductive elements comprise wide portions wider than other portions of the second conductive elements;

the at least one conductive member is welded to the wide portions of the second conductive elements; and the wide portions are wider than the first conductive elements.

* * * * *